(12) United States Patent
Suwa

(10) Patent No.: US 9,280,838 B2
(45) Date of Patent: Mar. 8, 2016

(54) COMPUTER PRODUCT, SEARCH APPARATUS, AND SEARCH METHOD

(71) Applicant: FUJITSU LIMITED, Kawasaki-shi (JP)

(72) Inventor: Tamon Suwa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 224 days.

(21) Appl. No.: 14/220,445

(22) Filed: Mar. 20, 2014

(65) Prior Publication Data

US 2014/0204095 A1     Jul. 24, 2014

Related U.S. Application Data

(63) Continuation of application No. PCT/JP2011/071406, filed on Sep. 20, 2011.

(51) Int. Cl.
*G06T 11/20*     (2006.01)
*G06F 17/50*     (2006.01)

(52) U.S. Cl.
CPC ............ *G06T 11/20* (2013.01); *G06F 17/5009* (2013.01); *G06F 2217/16* (2013.01)

(58) Field of Classification Search
None
See application file for complete search history.

(56) References Cited

U.S. PATENT DOCUMENTS

2009/0070079 A1    3/2009    Harada
2009/0254316 A1    10/2009    Tillman et al.

FOREIGN PATENT DOCUMENTS

| JP | 2008-152423 | 7/2008 |
|---|---|---|
| JP | 2009-69930 | 4/2009 |
| JP | 2009-524161 | 6/2009 |
| JP | 2010-113467 | 5/2010 |

OTHER PUBLICATIONS

"Adaptive Smoothed Particle Hydrodynamics: Methodology. II."(Appendix C3), The Astrophysical Journal Supplement Series, Vo.116, pp. 155-209, Jun. 1998, by Owen et al.
"Numerical Simulation of Wave Overtopping on a Vertical Seawall by Using MPS Method", Proceedings of the Japan Society of Civil Engineers, Feb. 2003, No. 726,pp. 87-98, by Gotoh et al. Abstract.
International Search Report mailed Nov. 22, 2011, in corresponding International Application No. PCT/JP2011/071406.

*Primary Examiner* — Yingchun He
(74) *Attorney, Agent, or Firm* — Staas & Halsey LLP

(57) ABSTRACT

A search apparatus includes a storage device storing for particle data, positional information and a deformation gradient tensor; and a processor configured to generate based on the positional information, circumscribing shape data that circumscribes an influence region of the particle data; set, as a deformation object, the circumscribing shape data or region data; deform the deformation object by the deformation gradient tensor; judge whether an overlap exists between the deformed deformation object and a deformation-exempt object that is among the circumscribing shape data and the region data, and not set as the deformation object; determine particle data in the region data, as a neighbor particle data candidate of the object particle data, upon judging that an overlap exists between the deformed deformation object and the deformation-exempt object; and store to the storage device, a determination result.

20 Claims, 22 Drawing Sheets

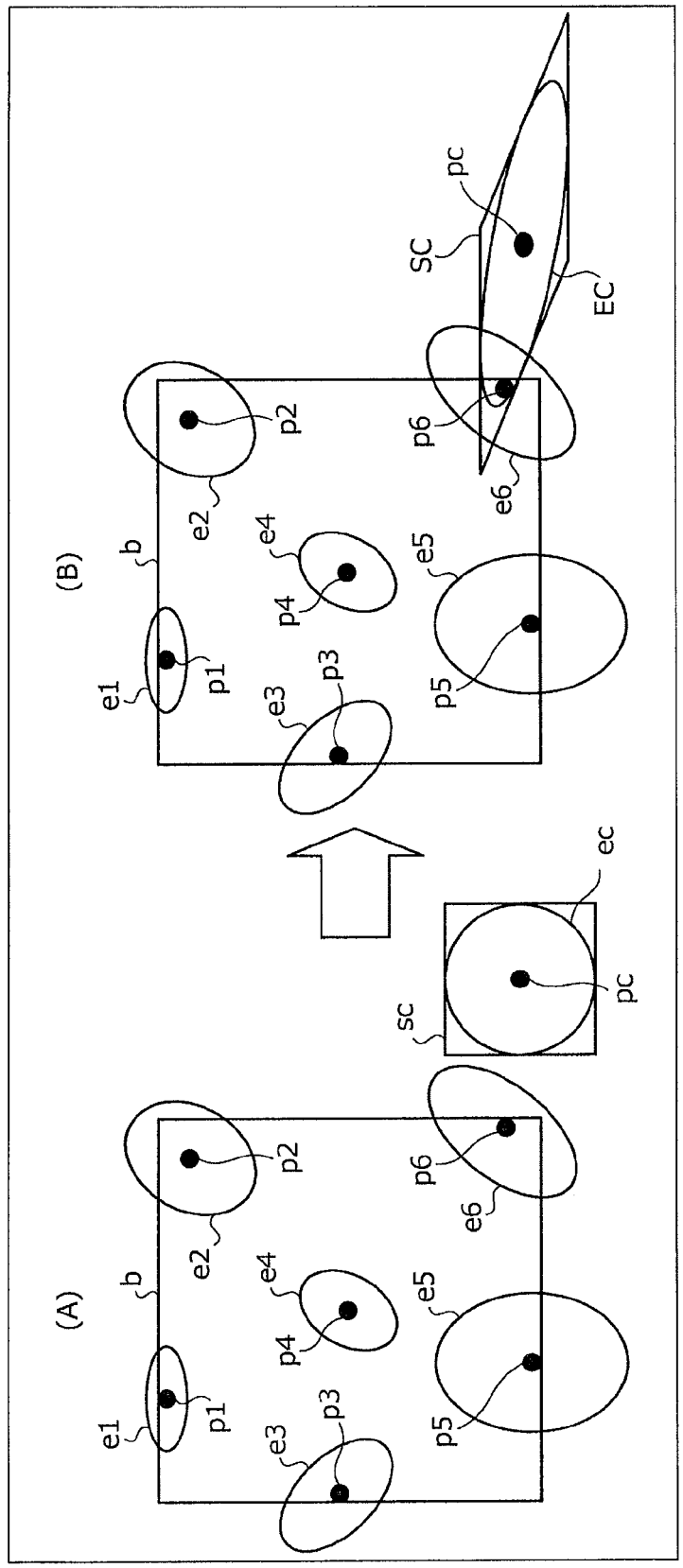

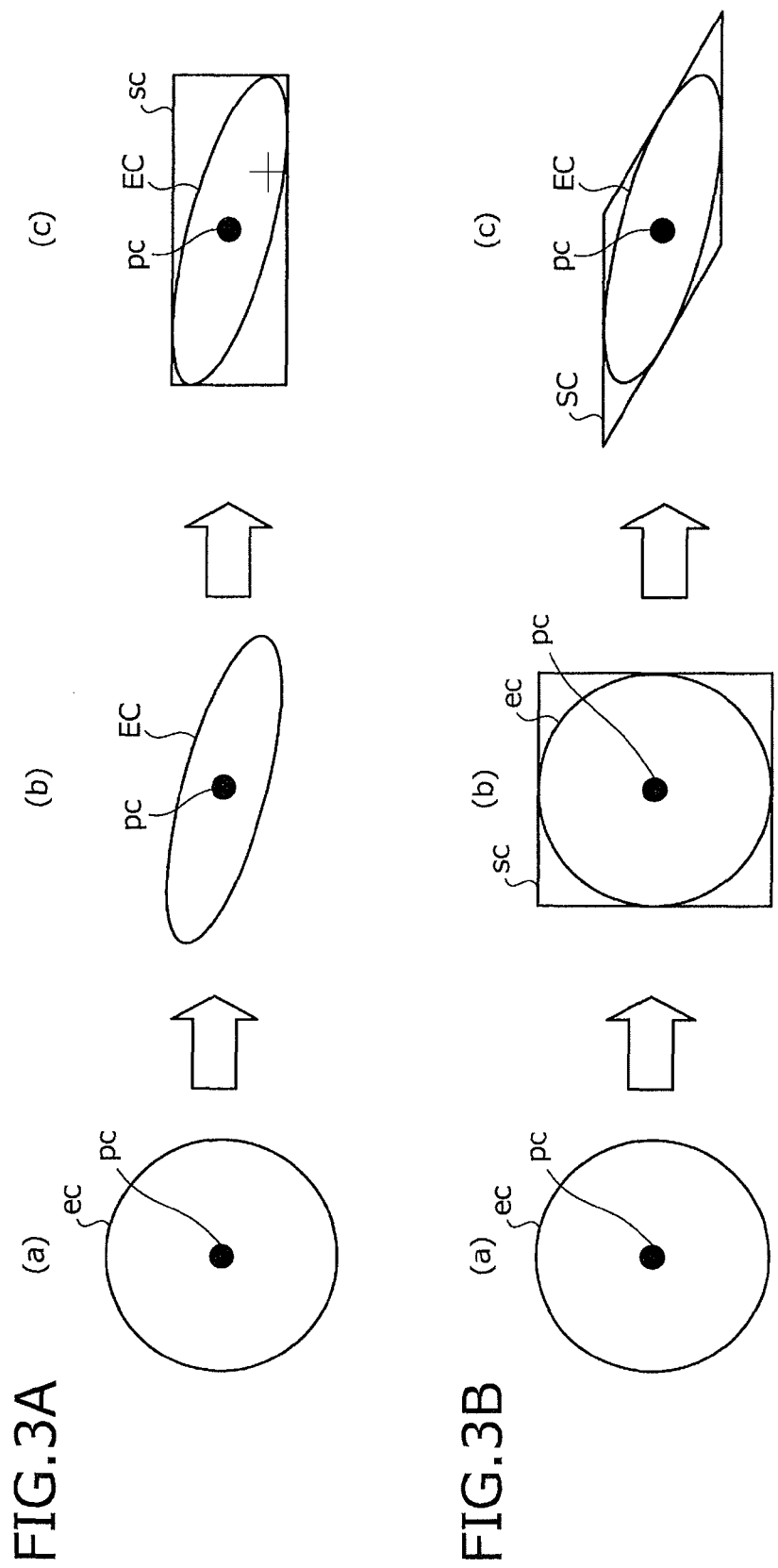

FIG.12

| RANK | REGION DATA | | | | | | | | | | | | |
|---|---|---|---|---|---|---|---|---|---|---|---|---|---|
| 1 | b1 | | | | | | | | | | | | |
| 2 | b11 | b12 | | | b13 | | | b14 | | | | | |
| 3 | - | b121 | b122 | b123 | b124 | b131 | b132 | b133 | b134 | - | b211 | b212 | b213 | b214 |

| | b2 | | | | | | | |
|---|---|---|---|---|---|---|---|---|
| | b21 | | | | b22 | b23 | b24 | |
| | | | | | | - | - | b241 | b242 | b243 | b244 |

REGION DATA

| b3 | | | | b4 | | | |
|---|---|---|---|---|---|---|---|
| b31 | b32 | b33 | b34 | b41 | b42 | b43 | b44 |
| b311 b312 b313 b314 | b331 b332 b333 b334 | - | - | b411 b412 b413 b414 | - | b431 b432 b433 b434 | b441 b442 b443 b444 |

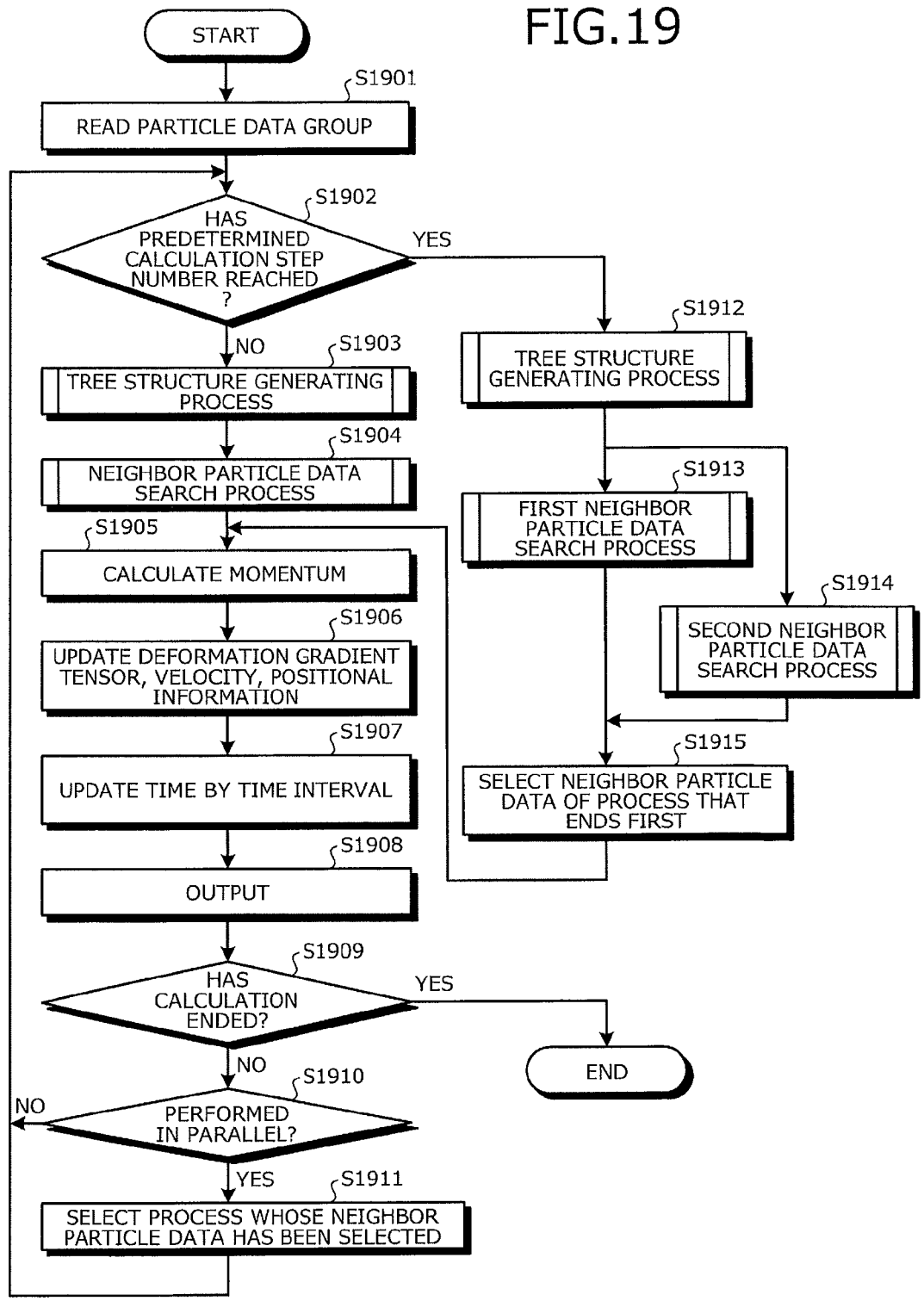

COMPUTER PRODUCT, SEARCH APPARATUS, AND SEARCH METHOD

CROSS REFERENCE TO RELATED APPLICATIONS

This application is a continuation application of International Application PCT/JP2011/071406, filed on Sep. 20, 2011 and designating the U.S., the entire contents of which are incorporated herein by reference.

FIELD

The embodiment discussed herein relates to a computer product, a search apparatus, and a search method.

BACKGROUND

The Smoothed Particles Hydrodynamics (SPH) method and the Moving Particles Semi-implicit (MPS) method are conventionally known methods of expressing a continuum as distribution of particles, in fluid analysis examining a flow of water or air by using numerical calculations and elastic body analysis examining behavior of compressed rubber. For example, Japanese Laid-Open Patent Publication No. 2008-152423 discloses a technique of numerically analyzing large deformation of a hyperelastic body by using the SPH method. Japanese Laid-Open Patent Publication No. 2010-113467 discloses a technique of performing image deformation by using the MPS method.

These standard particle-based techniques include calculating an interaction from only an opposing particle present in a region (hereinafter referred to as an "influence region") set in advance for a given particle. Therefore, as a part of the numerical analysis, a process is required for identifying a particle (hereinafter referred to as a "neighbor particle") in the influence region among the entire region subject to calculation. In modeling of standard particle methods, the influence region is defined as a spherical shape and a numeric value called an influence radius is simply set for each particle.

However, to deal with a state in which a continuum moves in a space while deforming, other techniques are present in which each particle is given a deformation gradient tensor $F_{ij}$ to perform the analysis by using an influence region that is deformed from an original shape by linear transformation. The subscripts i and j of the deformation gradient tensor $F_{ij}$ are indexes indicative of coordinate axes. The deformation gradient tensor $F_{ij}$ is a tensor field given by equation (1), where x denotes initial position coordinates of a continuum and X denotes position coordinates after deformation.

$$F_{ij} = \partial X_i / \partial x_j \quad (1)$$

To search for neighbor particles, if proximity is determined with respect each pair of particles, the number of times such determination must be made is proportional to the square of the total number of particles. Since this leads to extremely high calculation cost, a cell index method exists as a technique for accelerating the search for neighbor particles.

The cell index method includes dividing a calculation region into cells of a width equivalent to the influence radius, and searching for a neighbor particle of a given particle i, within the same cell as the given particle i and adjacent cells. If particles are equally distributed in the cells (where, the total number of particles is N), the cell index method requires a calculation amount of O(N) and is faster than the direct method of handling each of the particle pairs and having an calculation amount of $O(N^2)$.

Japanese Laid-Open Patent Publication No. 2008-152423 discloses a technique based on the cell index method as a neighbor particle search technique for the SPH method, which has an anisotropic influence region. In this technique, each continuum particle is assumed to belong to a cell of about the size of the influence region and first, a list of neighbor particle candidates common to a particle group included in the cell is created (hereinafter an arbitrary particle group is referred to as a "particle group i"; an individual particle included in the particle group i is referred to as an "i-particle").

The neighbor particle candidate list generally includes the particle group i. Whether a particle included in this list and a particle of the particle group i are neighbor particles is individually judged for each of pair of particles. Therefore, when $N_i$ is the number of particles included in the particle group i and $N_j$ is the number of particles included in the neighbor particle candidate list, the number of times that comparison must be performed is $O(N_i N_j)$ per cell. Thus, if the number of particles included in the neighbor particle candidate list can be reduced, the cost required for the neighbor particle search can be reduced.

In the Astrophysical Journal Supplement Series 1998, 116, pp. 208-209, (Appendix C3), Owen, Villumsen, Shapiro, and Martel propose to reduce the number of particles of the neighbor particle candidate list by taking deformation of an influence region into consideration. For example, the following procedure is utilized.

First, the minimum value and the maximum value of coordinates of the i-particles are examined and referred to as $xi_{min}$ and $xi_{max}$, respectively. These values are set for each coordinate axis to construct a minimum space Si that includes the entire particle group i (a rectangle in a two-dimensional case or a rectangular parallelepiped in a three-dimensional case). The minimum/maximum coordinates of the influence region, which may be deformed, of the i-particles are obtained and defined as $xih_{min}$ and $xih_{max}$, respectively. These coordinates are set for each coordinate axis. A space Shi (a rectangle in a two-dimensional case or a rectangular parallelepiped in a three-dimensional case) is set from $xih_{min}$ and $xih_{max}$.

The space Shi encompasses the space Si; and a particle included in the influence region of the i-particles is always included in the space Shi. Therefore, if a given particle $j_1$ is included in the space Shi, the particle $j_1$ is added to the neighbor particle candidate list. As a result, the number of particles included in the neighbor particle candidate list is reduced with consideration that the degree of deformation differs for each coordination axis.

On the other hand, even if a given particle $j_2$ is outside the space Shi, the influence region of the particle $j_2$ may include a particle i. In such a case, if a rectangle (or a rectangular parallelepiped) circumscribed by the influence region of the particle $j_2$ and the space Shi have a common region, the particle $j_2$ is also added to the neighbor particle candidate list.

Nonetheless, with the conventional techniques, if a particle has an influence region highly deformed in an oblique direction relative to a coordinate axis, the particle is added to the neighbor particle candidate list when the circumscribed rectangle (or rectangular parallelepiped) overlaps though the influence region does not overlap. Therefore, the neighbor particle candidate list includes more particles than necessary, thereby reducing search accuracy and causing a problem of an increased calculation load.

SUMMARY

According to an aspect of an embodiment, a non-transitory, computer-readable recording medium stores a search program for searching for a neighbor particle located in proximity of an object particle. The search program causes a computer to execute a process that includes generating circumscribing shape data that circumscribes an influence region of object particle data, the circumscribing shape data being generated based on positional information of the object particle data that is in a particle data group read from a storage device that stores for each particle data in the particle data group, positional information and a deformation gradient tensor; setting as a deformation object, any one among the generated circumscribing shape data and region data that has at least one particle data among the particle data group; deforming the set deformation object, based on the deformation gradient tensor of the object particle data; judging whether an overlap exists between the deformed deformation object and a deformation-exempt object that is among the circumscribing shape data and the region data, and not set as the deformation object; determining particle data in the region data, as a neighbor particle data candidate of the object particle data, upon judging that an overlap exists between the deformed deformation object and the deformation-exempt object; and storing to the storage device, a result of the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an explanatory view of a neighbor particle search example (part two) in a two-dimensional space;

FIGS. 3A and 3B are explanatory views of examples (part one) of deformation of circumscribing shape data sc by a deformation gradient tensor $Fc_{ij}$.

FIG. 12 is an explanatory view of an example of a tree structure of a region data group acquired through the recursive division depicted in FIGS. 11A, 11B, 11C, and 11D;

FIG. 19 is a flowchart of a search process example (part two) of the search apparatus 1000.

DESCRIPTION OF EMBODIMENTS

An embodiment of a search program, a search apparatus, and a search method will be described in detail with reference to the accompanying drawings.

Figure 1A:
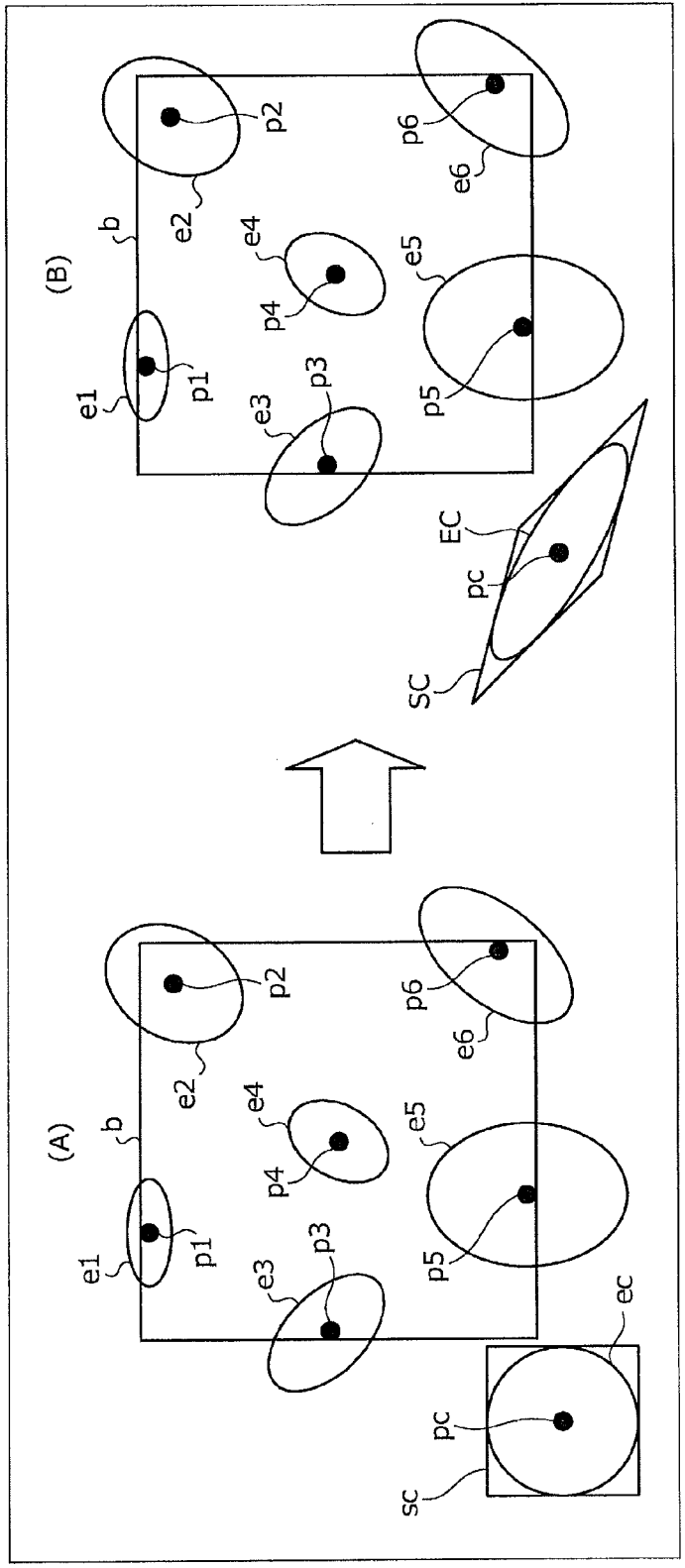
FIG. 1A is an explanatory view of a neighbor particle search example (part one) in a two-dimensional space.

FIG. 1A is an explanatory view of a neighbor particle search example (part one) in a two-dimensional space. In FIG. 1A, (A) depicts a state before deformation and (B) depicts a state after deformation. In (A), a box b is region data having particle data p1 to p6. The particle data p1 to p6 have respective influence regions e1 to e6. The influence regions are regions set for respective particles and, if another particle is present in an influence region, interaction is assumed to occur with the other particle and the interaction is calculated. The influence regions are assumed to have an initial shape set in advance and are deformed as needed. A procedure of deformation of the influence regions will be described later. The particle data is data that indicates the center of a particle, for example. In this case, the influence region may be a region representing a shape of a particle.

The influence region generally has a complicated shape, making it difficult to directly determine whether the influence region and the box b have a common portion. Therefore, circumscribing shape data (a parallelogram in a two-dimensional case or a parallelepiped in a three-dimensional case) circumscribing the influence region is assumed and whether the circumscribing shape data and the box have a common portion is determined. Other particle data present in an influence region of a given particle data is referred to as neighbor particle data. By using the neighbor particle data, the given particle data can be updated in terms of physical properties such as a deformation gradient tensor, acceleration, and positional information.

An influence region ec of an object particle data pc and circumscribing shape data sc that includes the influence region ec are deformed by a deformation gradient tensor $Fc_{ij}$ (see Equation (2)) of the object particle data pc. In this embodiment, whether the influence region ec after deformation overlaps the box b must be determined regardless of whether the influence region ec before deformation overlaps the box b.

$$Fc_{ij} = \partial Xc_i / \partial Xc_j \qquad (2)$$

In Equation (2), the subscripts i and j of the deformation gradient tensor $Fc_{ij}$ are indexes indicative of coordinate axes. Additionally, xc denotes initial position coordinates of the object particle data pc before deformation and Xc denotes position coordinates after deformation.

(B) in FIG. 1A depicts a state after deformation by the deformation gradient tensor $Fc_{ij}$. By the deformation gradient tensor $Fc_{ij}$, the influence region ec is deformed into an influence region EC and the circumscribing shape data sc is deformed into circumscribing shape data SC. Subsequently, whether the deformed circumscribing shape data SC and the box b overlap is checked. In the example depicted in (B) of FIG. 1A, since no overlap exists between the deformed circumscribing shape data SC and the box b, the particle data p1 to p6 in the box b are excluded from being neighbor particle data candidates of the object particle data pc.

Figure 1B:
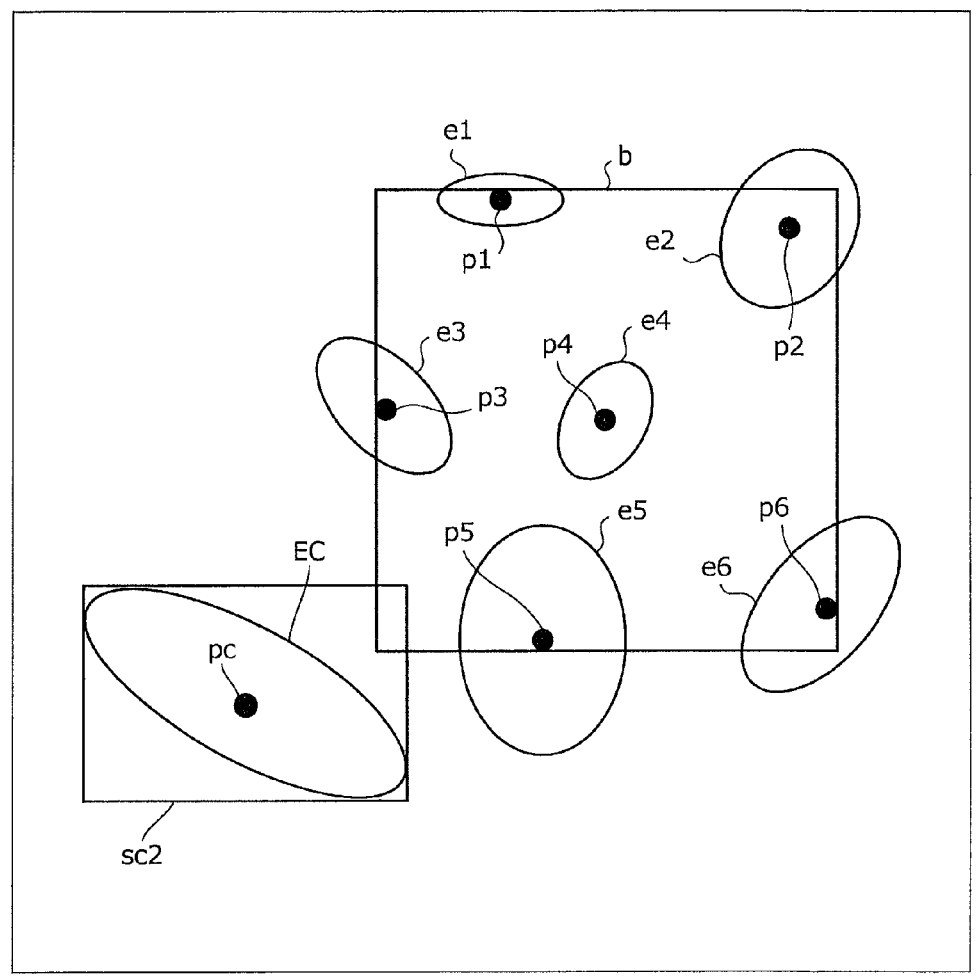
FIG. 1B is a diagram of a criterion for determining an overlap between an influence region and a box b according to a known technique.

FIG. 1B is a diagram of a criterion for determining an overlap between the influence region and the box b according to a technique proposed in the Astrophysical Journal Supplement Series 1998, 116, pp. 208-209, (Appendix C3) by Owen, et al. Since a rectangle sc2 circumscribing the deformed influence region ec overlaps the box b, the particle data p1 to p6 in the box b are included among the neighbor particle data candidates of the object particle data pc.

FIG. 2 is an explanatory view of a neighbor particle search example (part two) in a two-dimensional space. In FIG. 2, (A) depicts a state before deformation and (B) depicts a state after deformation. The position of the object particle data pc and the value of the deformation gradient tensor $Fc_{ij}$ are assumed to be different from those in FIGS. 1A and 1B. In (B) of FIG. 2, since an overlap exists between the deformed circumscribing shape data sc and the box b, the particle data p1 to p6 in the box b are neighbor particle data candidates of the object particle data pc. Among the particle data p1 to p6 in the box b, the particle data p6 present in the deformed influence region EC of the object particle data pc is determined as the neighbor particle data of the object particle data pc.

FIGS. 3A and 3B are explanatory views of examples (part one) of deformation of the circumscribing shape data sc by the deformation gradient tensor $Fc_{ij}$. FIG. 3A depicts a deformation example according to the technique proposed in the Astrophysical Journal Supplement Series 1998, 116, pp. 208-209, (Appendix C3) by Owen, et al. FIG. 3B depicts a deformation example according to the present embodiment (see FIGS. 1 and 2). In FIG. 3A, the influence region ec before deformation (a) is deformed by the deformation gradient tensor $Fc_{ij}$ into the influence region EC (b). The circumscribing shape data sc of the influence region EC is generated (c).

On the other hand, in FIG. 3B, the circumscribing shape data sc of the influence region ec before deformation (a) is generated (b). The influence region ec and the circumscribing shape data sc are deformed by the deformation gradient tensor $Fc_{ij}$ into the influence region EC and the circumscribing shape data SC (c). The circumscribing shape data SC of the influence region EC is generated.

As described, although the circumscribing shape data sc is not deformed by the deformation gradient tensor $Fc_{ij}$ in the example depicted in FIG. 3A, the circumscribing shape data sc is deformed by the deformation gradient tensor $Fc_{ij}$ in the example depicted in FIG. 3B. When the circumscribing shape data sc is deformed by deformation gradient tensor $Fc_{ij}$ together with the influence region ec in this way, the deformed circumscribing shape data SC has a shape that follows the deformation of the influence region EC. Therefore, in the circumscribing shape data sc, the region (an area in a two-dimensional case or a volume in a three-dimensional case) exclusive of the influence region EC is made smaller, as compared to the circumscribing shape data sc depicted in FIG. 3A. Thus, meaningless overlap with the box b as depicted in FIG. 1B can be prevented.

Figure 4A:
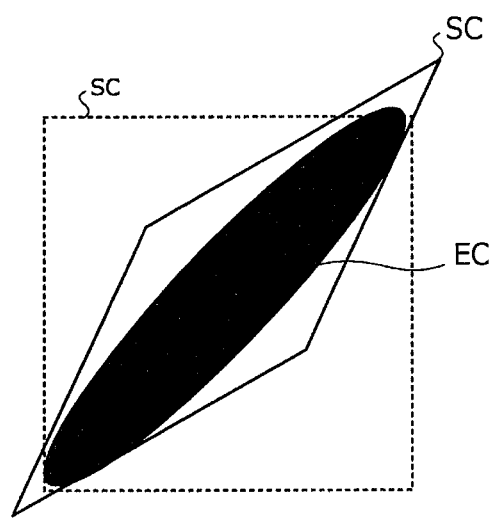
FIGS. 4A and 4B are explanatory views of an influence region EC and the circumscribing shape data sc after deformation.
Figure 4B:

FIGS. 4A and 4B are explanatory views of the influence region EC and the circumscribing shape data sc after deformation. In FIG. 4A, on the assumption that the volume of a continuum particle data group is preserved, the influence region EC and the circumscribing shape data sc are stretched by a factor of $\lambda$ in an oblique direction (at 45 degrees) relative to a coordinate axis and are shortened in the direction orthogonal to the oblique direction by a factor of $1/\lambda$ in a two-dimensional case or $1/\sqrt(\lambda)$ in a three-dimensional case. According to the technique proposed in the Astrophysical Journal Supplement Series 1998, 116, pp. 208-209, (Appendix C3) by Owen, et al, the sides of the circumscribing shape data sc are stretched by a factor of $\lambda$ and therefore, whether a neighbor particle candidate is included must be examined in a region having a size that compared to the initial size, is increased by a factor of $\lambda^2$ in a two-dimensional case or by a factor of $\lambda^3$ in a three-dimensional case.

If particle density is constant, this means that when it is determined whether particle data are neighbor particle data, the number of particle data pairs increases by a factor of $\lambda^2$ in a two-dimensional case or by a factor of $\lambda^3$ in a three-dimensional case. In contrast, since neither the area nor the volume are changed in the parallelogram (or the parallelepiped) formed by the deformation gradient tensor $Fc_{ij}$ on the assumption that the volume is preserved, the number of particle data pairs for which determination concerning the neighbor particle data is made, does not significantly change. On the other hand, when the continuum is stretched along the coordinate axis, the shapes of the circumscribing shape data sc and SC (parallelogram in a two-dimensional case or parallelepiped in a three-dimensional case) are identical as depicted in FIG. 4B.

Figure 5:
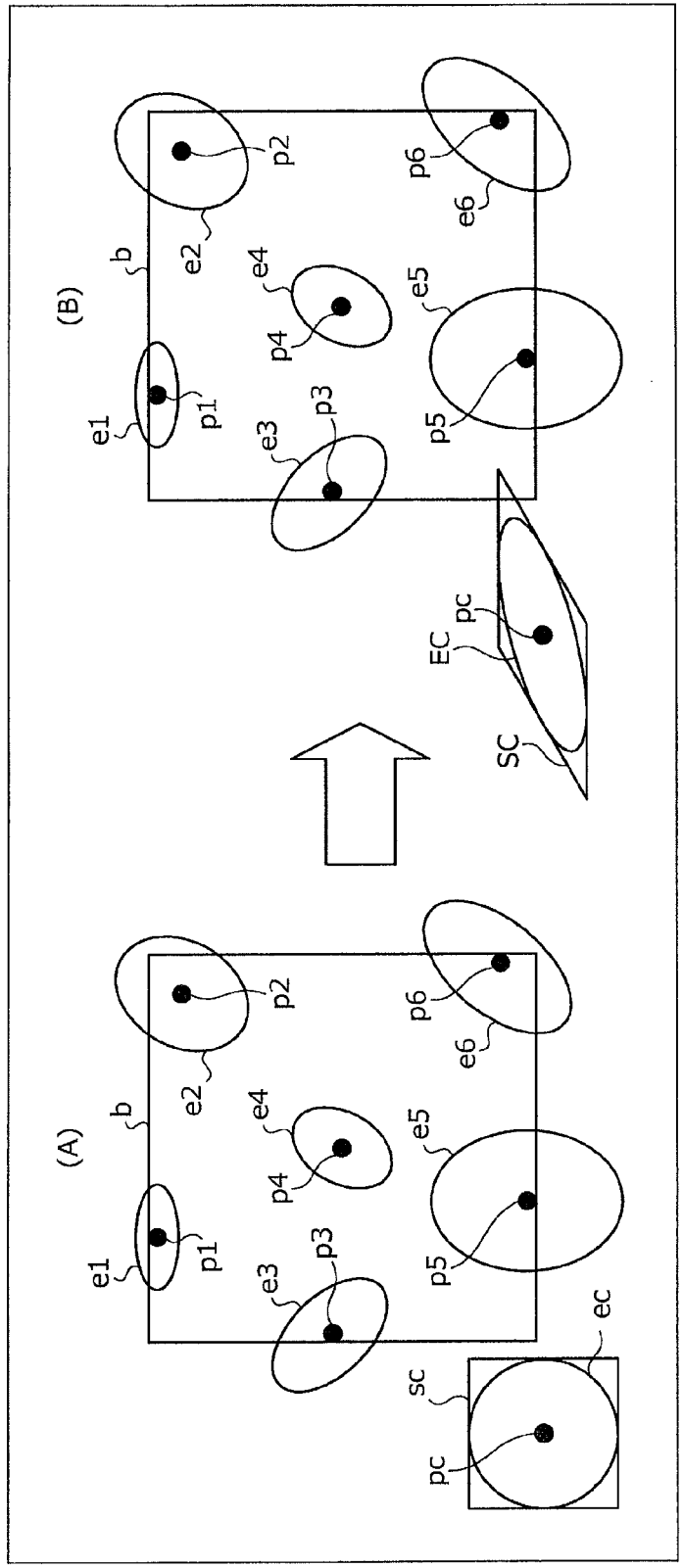
FIG. 5 is an explanatory view of a neighbor particle search example (part three) in a two-dimensional space.

FIG. 5 is an explanatory view of a neighbor particle search example (part three) in a two-dimensional space. In FIG. 5, ($\lambda$) depicts a state before deformation and (B) depicts a state after deformation. The position of the object particle data pc and the value of the deformation gradient tensor $Fc_{ij}$ are assumed to be different from those of FIGS. 1A and 1B. In (B) of FIG. 5, unlike (B) of FIG. 1A, since an overlap exists between the deformed circumscribing shape data SC and the box b, the particle data p1 to p6 in the box b are defined as the neighbor particle data candidates of the object particle data pc. However, among the particle data p1 to p6 in the box b, no particle data is present in the deformed influence region EC of the object particle data pc and therefore, no neighbor particle data exists for the object particle data pc.

In the case of (B) in FIG. 5, although not included in the influence region EC, the box b overlaps the circumscribing shape data SC and therefore, more boxes than actually necessary may be determined to be overlapping. When the degree of flattening consequent to deformation is high, more erroneous determinations are made. Therefore, if such erroneous determinations are continuously made, the box b is subject to deformation instead of the influence region ec and the circumscribing shape data sc of the object particle data pc.

Figure 6:
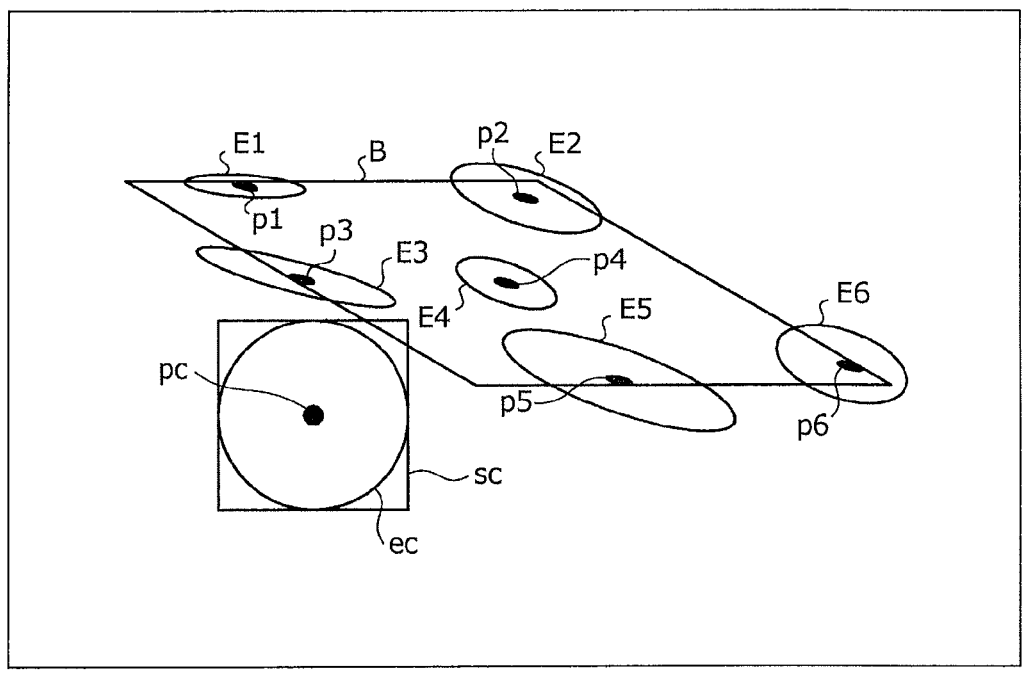
FIG. 6 is an explanatory view of a neighbor particle search example (part four) in a two-dimensional space.

FIG. 6 is an explanatory view of a neighbor particle search example (part four) in a two-dimensional space. FIG. 6 depicts a state of deforming the box b instead of the influence region ec and the circumscribing shape data sc of the object particle data pc. In FIG. 6, the box b is deformed by an inverse tensor $Fc_{ij}^{-1}$ of the deformation gradient tensor $Fc_{ij}$ of the object particle data pc. As a result, the box b in (A) of FIG. 5 is deformed into a box B, and the influence regions e1 to e6 of the particle data p1 to p6 are deformed into influence regions E1 to E6. The positions of the particle data p1 to p6 also change.

Since no overlap exists between the influence region ec of the object particle data pc and the deformed box B, the particle data p1 to p6 are not included among the neighbor particle data candidates of the object particle data pc.

Figure 7:
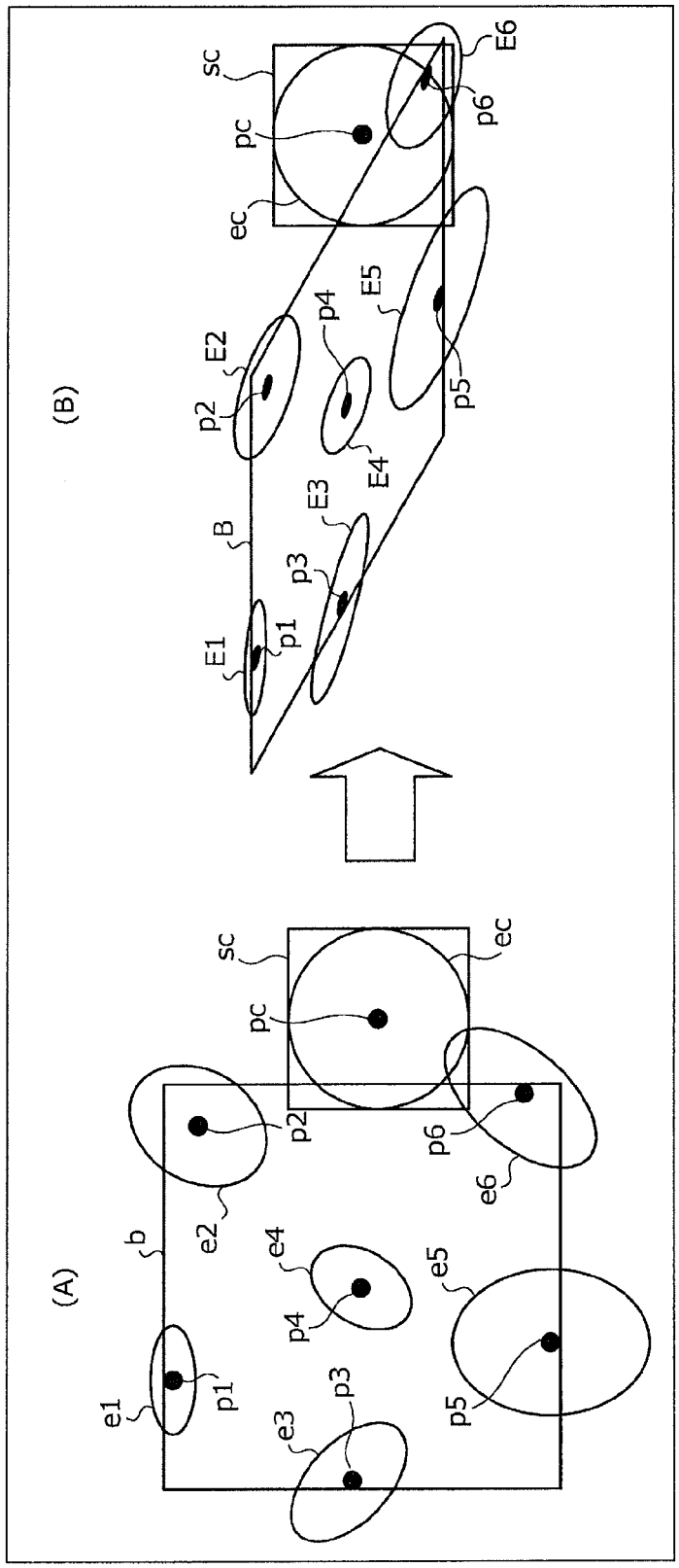
FIG. 7 is an explanatory view of a neighbor particle search example (part five) in a two-dimensional space.

FIG. 7 is an explanatory view of a neighbor particle search example (part five) in a two-dimensional space. In FIG. 7, (A) depicts a state before deformation and (B) depicts a state after deformation. The position of the object particle data pc and the value of the deformation gradient tensor $Fc_{ij}$ are assumed to be different from those of FIG. 5. In (B) of FIG. 7, the box b is deformed by the inverse tensor $Fc_{ij}^{-1}$ of the deformation gradient tensor $Fc_{ij}$ of the object particle data pc. As a result, the box b in (λ) of FIG. 7 is deformed into the box B, and the influence regions e1 to e6 of the particle data p1 to p6 are deformed into the influence regions E1 to E6. The positions of the particle data p1 to p6 also change.

In this case, unlike the example depicted in FIG. 6, since overlap exists between the influence region ec of the object particle data pc and the deformed box B, the particle data p1 to p6 are included among the neighbor particle data candidates of the object particle data pc.

When the deformation gradient tensor $Fc_{ij}$ is expressed by Equation (3), the inverse tensor $Fc_{ij}^{-1}$ is expressed by Equation (4).

$$Fc_{ij} = \begin{pmatrix} Fc_{11} & Fc_{12} & Fc_{13} \\ Fc_{21} & Fc_{22} & Fc_{23} \\ Fc_{31} & Fc_{32} & Fc_{33} \end{pmatrix} \quad (3)$$

$$Fc_{ij}^{-1} = \frac{1}{J}\begin{pmatrix} Fc_{22}Fc_{33} - Fc_{23}Fc_{32} & -Fc_{12}Fc_{33} + Fc_{13}Fc_{32} & Fc_{12}Fc_{23} - Fc_{13}Fc_{22} \\ -Fc_{21}Fc_{33} + Fc_{23}Fc_{31} & Fc_{11}Fc_{33} - Fc_{13}Fc_{31} & -Fc_{11}Fc_{23} + Fc_{13}Fc_{21} \\ Fc_{21}Fc_{32} - Fc_{22}Fc_{31} & -Fc_{11}Fc_{32} + Fc_{12}Fc_{31} & Fc_{11}Fc_{22} - Fc_{12}Fc_{21} \end{pmatrix} \quad (4)$$

In Equation (4), J is Equation (5) below.

$$J = \epsilon_{ijk} Fc_{1i} Fc_{2j} Fc_{3k} \quad (5)$$

Where, $\epsilon_{ijk}$ is the Levi-Civita symbol and, when a subscript set (i,j,k) is (1,2,3), (2,3,1), or (3,1,2), $\epsilon_{ijk} = +1$; when (i,j,k) is (1,3,2), (2,1,3), or (3,2,1), $\epsilon_{ijk} = -1$; and in other cases, $\epsilon_{ijk} = 0$.

Figure 8:
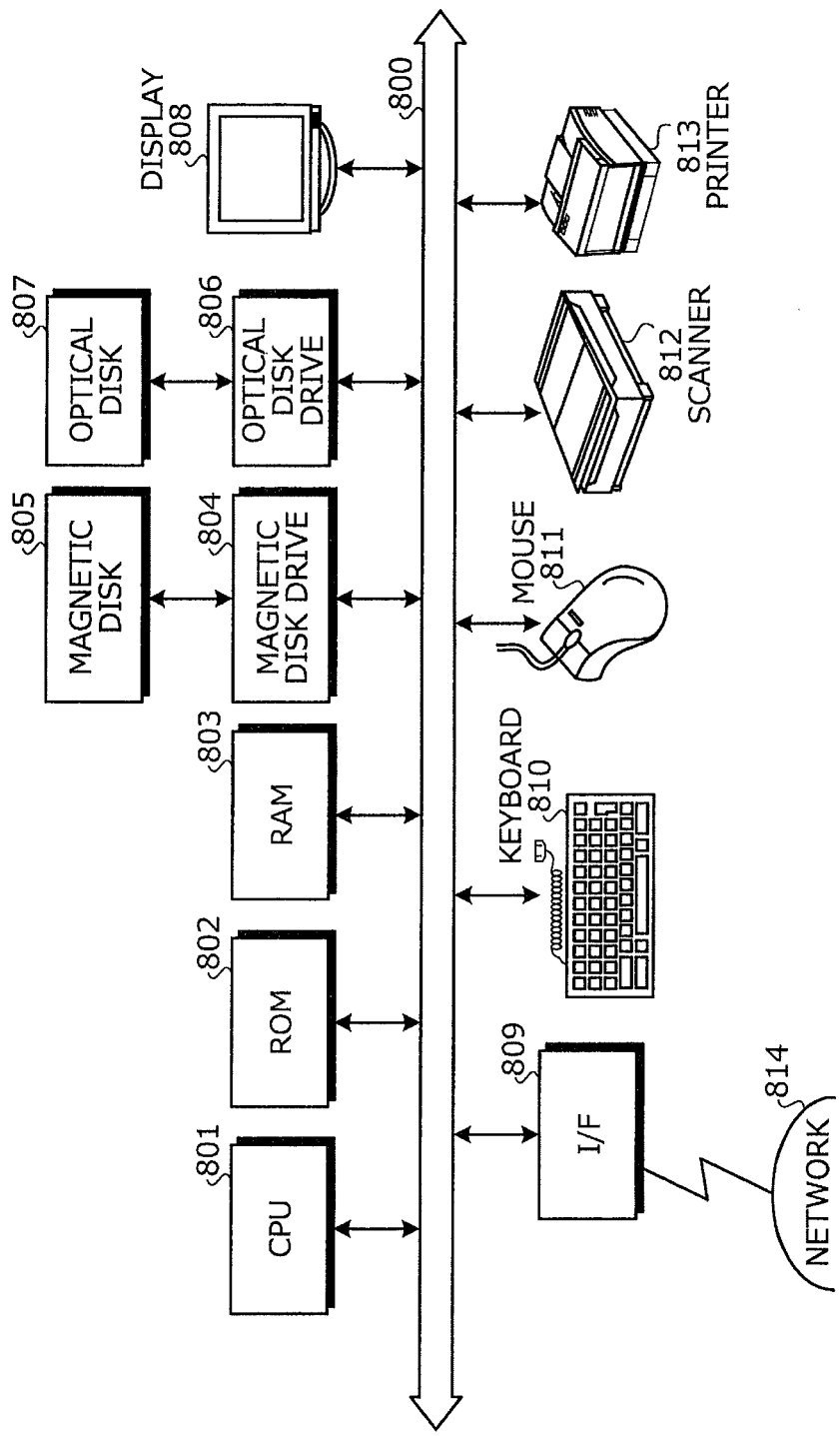
FIG. 8 is a block diagram of a hardware configuration of a search apparatus according to an embodiment.

FIG. 8 is a block diagram of a hardware configuration of a search apparatus according to the embodiment. As depicted in FIG. 8, the search apparatus includes a central processing unit (CPU) 801, read-only memory (ROM) 802, random access memory (RAM) 803, a magnetic disk drive 804, a magnetic disk 805, an optical disk drive 806, an optical disk 807, a display 808, an interface (I/F) 809, a keyboard 810, a mouse 811, a scanner 812, and a printer 813, respectively connected by a bus 800.

The CPU 801 governs overall control of the search apparatus. The ROM 802 stores therein programs such as a boot program. The RAM 803 is used as a work area of the CPU 801. The magnetic disk drive 804, under the control of the CPU 801, controls the reading and writing of data with respect to the magnetic disk 805. The magnetic disk 805 stores therein data written under control of the magnetic disk drive 804.

The optical disk drive 806, under the control of the CPU 801, controls the reading and writing of data with respect to the optical disk 807. The optical disk 807 stores therein data written under control of the optical disk drive 806, the data being read by a computer.

The display 808 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 808.

The I/F 809 is connected to a network 814 such as a local area network (LAN), a wide area network (WAN), and the Internet through a communication line and is connected to other apparatuses through the network 814. The I/F 809 administers an internal interface with the network 814 and controls the input/output of data from/to external apparatuses. For example, a modem or a LAN adaptor may be employed as the I/F 809.

The keyboard 810 includes, for example, keys for inputting letters, numerals, and various instructions and performs the input of data. Alternatively, a touch-panel-type input pad or numeric keypad, etc. may be adopted. The mouse 811 is used to move the cursor, select a region, or move and change the size of windows. A track ball or a joy stick may be adopted provided each respectively has a function similar to a pointing device.

The scanner 812 optically reads an image and takes in the image data into the search apparatus. The scanner 812 may have an optical character reader (OCR) function as well. The printer 813 prints image data and text data. The printer 813 may be, for example, a laser printer or an ink jet printer.

Figure 9:
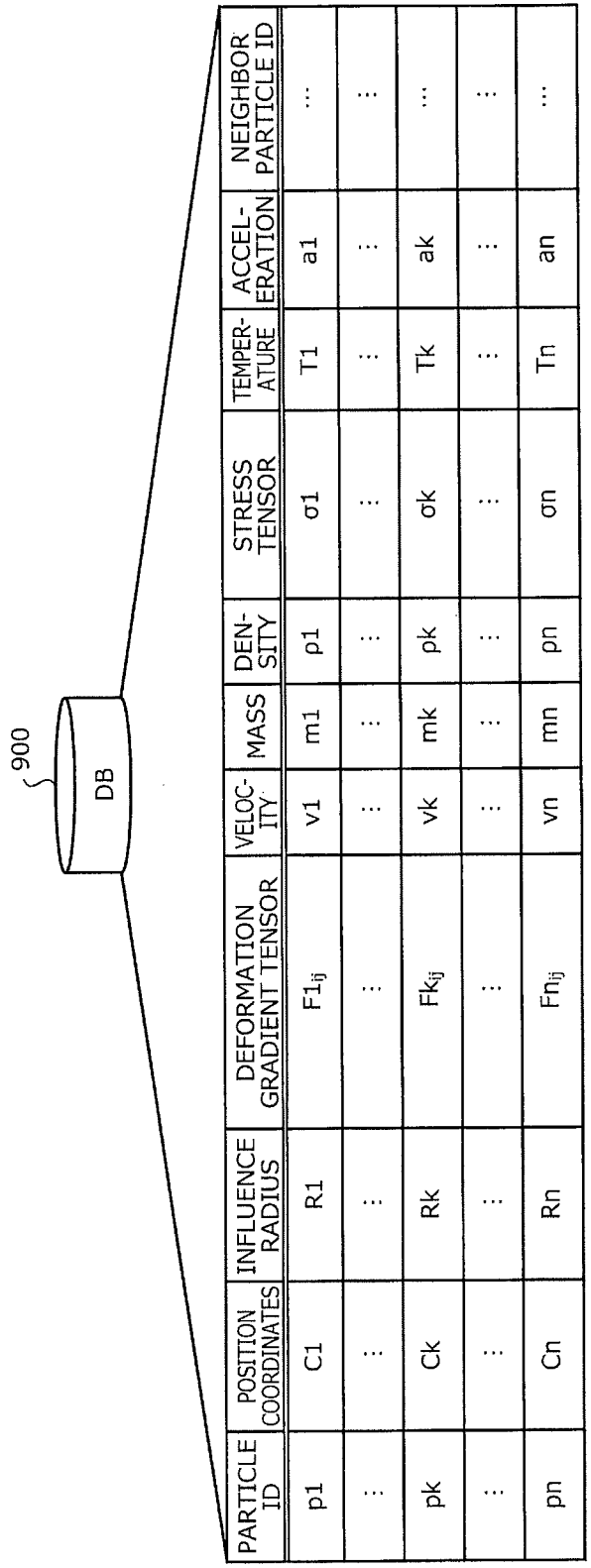
FIG. 9 is an explanatory view of an example of the contents of a database (DB)

FIG. 9 is an explanatory view of an example of the contents of a database (DB). For example, a function of a DB 900 is implemented by a storage device such as the ROM 802, the RAM 803, the magnetic disk 805, and the optical disk 807 depicted in FIG. 8. For example, the DB 900 has a particle ID field, a position coordinate field, an influence radius field, a deformation gradient tensor field, a velocity field, a mass field, a density field, a stress tensor field, a temperature field, an acceleration field, and a neighbor particle ID field. The DB 900 stores values for the fields for each particle data.

In this embodiment, for example, the DB 900 in the initial state stores for each particle data pk, the initial values of: particle ID: pk, position coordinates Ck, influence radius Rk, deformation gradient tensor $FK_{ij}$, velocity vk, mass mk, density pk, stress tensor σk, and temperature Tk. Acceleration ak is obtained by a calculation and therefore has no initial value. The neighbor particle ID is stored after a search and therefore has no initial value. The position coordinate Ck, the influence radius Rk, the deformation gradient tensor $FK_{ij}$, the velocity vk, the mass mk, the density pk, the stress tensor σk, the temperature Tk, the acceleration ak, and the neighbor particle ID are registered for each calculation step. The values of the previous step may be stored or overwritten. The mass mk, the density pk, the stress tensor σk, and the temperature Tk may be fixed values.

Figure 10:
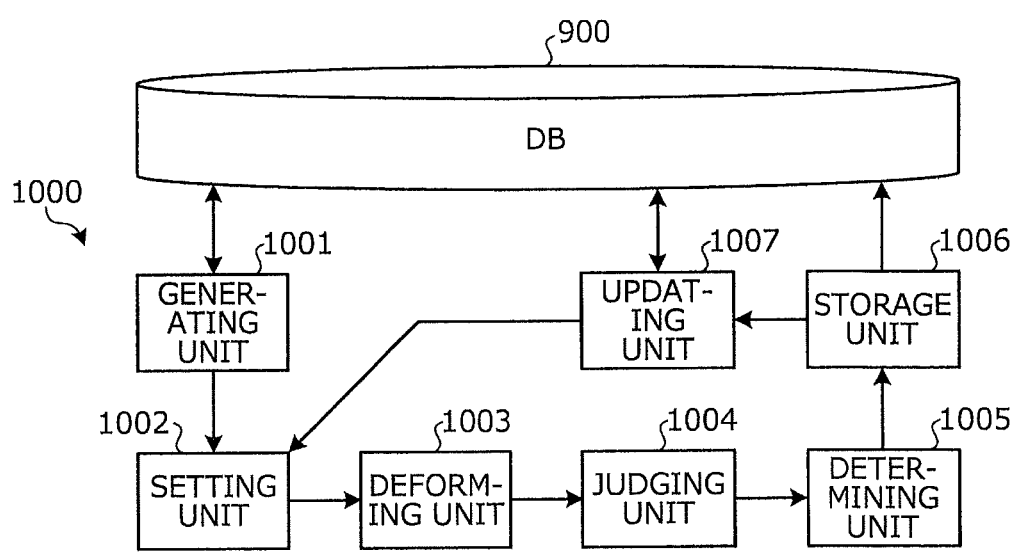
FIG. 10 is a block diagram of a functional configuration example of a search apparatus.

FIG. 10 is a block diagram of a functional configuration example of a search apparatus. A search apparatus 1000 includes the DB 900, a generating unit 1001, a setting unit 1002, a deforming unit 1003, a judging unit 1004, a determining unit 1005, a storage unit 1006, and an updating unit 1007. For example, functions of the generating unit 1001 to the updating unit 1007 are implemented by causing the CPU 801 to execute a program stored in the ROM 802, the RAM 803, the magnetic disk 805, the optical disk 807, etc. depicted in FIG. 8, or by the I/F 809.

The generating unit 1001 divides a calculation region that is to be subject to calculation and where particle group data exists. The generating unit 1001, thereby, generates partial region data groups. For example, a Tree method is used for recursively dividing the calculation region into boxes. An example of recursive box division using the Tree method will be described.

FIGS. 11A, 11B, 11C, and 11D are explanatory views of an example of recursive box division using the Tree method. In an example described with reference to FIGS. 11A, 11B, 11C, and 11D, the region is divided such that a length of a side is divided into halves, and the division is recursively performed until the number of particle data in a divided block is reduced to one or less or a rank r=3 is satisfied. The rank r indicates the number of times the division is performed.

Figure 11A:
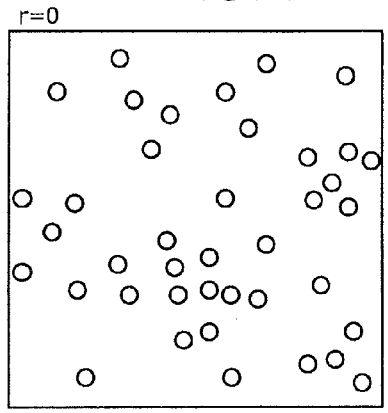
FIGS. 11A, 11B, 11C, and 11D are explanatory views of an example of recursive box division using a Tree method.
Figure 11B:
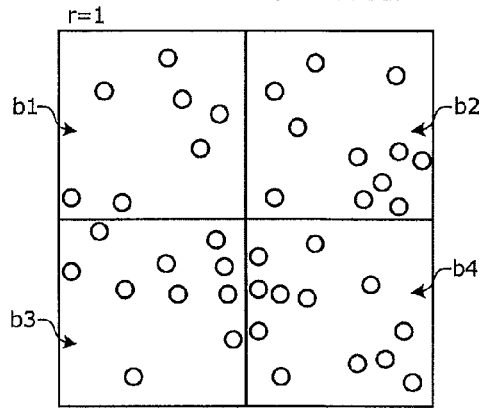

FIG. 11A depicts a calculation area A before division. Since the division has not yet been performed, the rank r is r=0. Circle graphics in the calculation area A represent the particle data group. FIG. 11B depicts an example of division from the state depicted in FIG. 11A. In FIG. 11B, when the calculation area A is divided into four areas, the rank r is changed to r=1 and blocks b1 to b4 are generated. In FIG. 11B, since the rank r is one and the number of particle data in each of the blocks b1 to b4 is greater than or equal to two, the recursive division is further performed for the blocks b1 to b4.

Figure 11C:
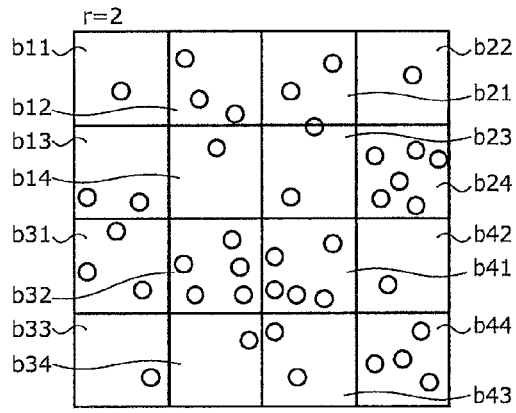

FIG. 11C depicts an example of division from the state depicted in FIG. 11B. In FIG. 11C, each of the blocks b1 to b4 in FIG. 11B is divided into four areas, and blocks b11 to b44 are generated. In FIG. 11C, the rank r is two. Among the blocks b11 to b44, the blocks b11, b22, b14, b23, b33, b34, and b42 are not to be further divided since the number of particle data is one. The other blocks b12, b13, b21, b24, b31, b32, b41, b43, and b44 are further divided.

Figure 11D:
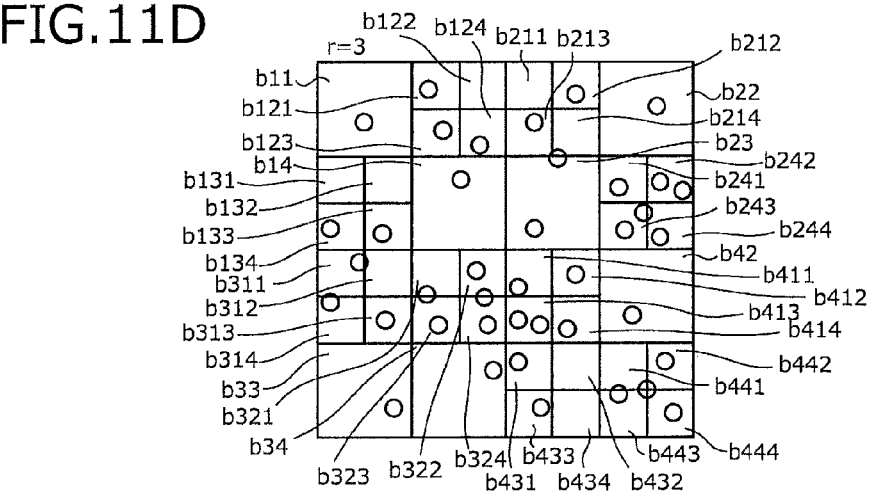

FIG. 11D depicts an example of division from the state depicted in FIG. 11C. In FIG. 11D, each of the blocks b12, b13, b21, b24, b31, b32, b41, b43, and b44 in FIG. 11C is divided into four areas, and blocks b121 to b444 are generated. Since the rank r is three in FIG. 11D, the division is terminated regardless of the number of particle data in a block. A block group ultimately acquired in FIG. 11D is a divided region data group.

FIG. 12 is an explanatory view of an example of a tree structure of the region data group acquired through the recursive division depicted in FIGS. 11A, 11B, 11C, and 11D. When the tree structure depicted in FIG. 12 is generated, particle data in a block is identified by the vertex coordinates of the block and the position coordinates of the particle data in the DB 900. The particle ID of the identified particle data is stored in a corresponding block of the tree structure.

For example, the particle ID of the particle data present in the block b1 is stored in the block b1; the particle ID of the particle data present in the block b12 is stored in the block b12; and the particle ID of the particle data present in the block b123 is stored in the block b123.

The reference of the description returns to FIG. 10. The generating unit 1001 sequentially specifies particle data among the particle data group. The specified particle data is the object particle data pc. When the particle data pk is specified, the generating unit 1001 extracts the position coordinates Ck and the influence radius Rk of the particle data pk from the DB 900. The generating unit 1001 generates an influence region ek based on the position coordinates Ck and the influence radius Rk. The influence region ek is a circle with the radius Rk in a two-dimensional case, and the influence region ek is a sphere with the radius Rk in a three-dimensional case.

The generating unit 1001 generates based on positional information of the object particle data in the particle data group, circumscribing shape data circumscribing the influence area of the object particle data. For example, the generating unit 1001 refers to the DB 900 to sequentially select the particle ID of the particle data among the particle data group and acquires the position coordinates Ck used as the positional information. The particle data pk of the selected particle ID is the object particle data pc. The generating unit 1001 then generates the influence region ec by referring to the influence radius of the object particle data pc. The generating unit 1001 generates the circumscribing shape data sc for the influence region ec.

The setting unit 1002 sets as a deformation object either "the block b that is region data having at least one data of the particle data group" or "the circumscribing shape data sc generated by the generating unit 1001". For example, in the initial state, the circumscribing shape data sc is set as the deformation object, and the block b, i.e., the region data is set as a deformation-exempt object. In the initial state, the block b, i.e., the region data may be set as the deformation object, and the circumscribing shape data sc may be set as the deformation-exempt object. The setting unit 1002 can switch and set the deformation object from the circumscribing shape data sc to the region data, or from the block b, i.e., the region data, to the circumscribing shape data sc. For example, the setting unit 1002 can alternately switch the deformation object at a predetermined timing, such as, each time a predetermined period elapses.

The deforming unit 1003 deforms the deformation object set by the setting unit 1002, based on the deformation gradient tensor $Fc_{ij}$ of the object particle data pc. For example, if the circumscribing shape data sc is the deformation object, as depicted in FIG. 3B, the circumscribing shape data sc (including the influence region ec) is subject to the deformation gradient tensor $Fc_{ij}$ to deform the circumscribing shape data sc (including the influence region ec), and the circumscribing shape data SC (including the influence region EC) is obtained.

On the other hand, if the region data (e.g., the block b) is the deformation object, the inverse tensor $Fc_{ij}^{-1}$ of the deformation gradient tensor $Fc_{ij}$ is calculated. As depicted in FIG. 6, the block b is subject to the inverse tensor $Fc_{ij}^{-1}$ to deform the block b (including the influence region e1 to e6), and the block B (including the influence regions E1 to E6) is obtained.

The judging unit 1004 judges whether an overlap exists between the deformation object after the deformation by the deforming unit 1003 and the deformation-exempt object, i.e., the circumscribing shape data or the region data that is not set as the deformation object. For example, if the deformation object is the circumscribing shape data sc, it is judged whether an overlap exists between the deformed circumscribing shape data SC and the block b. For example, the judging unit 1004 judges that no overlap exists in the example depicted in (B) of FIG. 1A. The judging unit 1004 judges that an overlap exists in the example depicted in (B) of FIG. 2 or in (B) of FIG. 5.

If the judging unit 1004 judges that an overlap exists, the determining unit 1005 determines the particle data in the region data to be a neighbor particle data candidate of the object particle data pc. For example, since no overlap exists in the example depicted in (B) of FIG. 1A, no neighbor particle data candidate is determined. Since it is determined that an overlap exists in the example depicted in (B) of FIG. 2 and in (B) of FIG. 5, the determining unit 1005 determines the particle data P1 to P6 in the block b to neighbor particle data candidates of the object particle data pc.

The storage unit 1006 stores into the storage device, the determination result obtained by the determining unit 1005.

For example, the storage unit 1006 stores into the DB 900, the particle ID of a neighbor particle data candidate for each particle data.

If the deformation object is the circumscribing shape data sc and consequent to the determination of a neighbor particle data candidate by the determining unit 1005, the judging unit 1004 judges whether the neighbor particle data candidate overlaps the influence region EC that is deformed together with the deformation of the circumscribing shape data sc by the deforming unit 1003. For example, in the example depicted in (B) of FIG. 2, the neighbor particle data candidates are the particle data p1 to p6, and the particle data p6 overlaps the influence region EC. On the other hand, in the example depicted in (B) of FIG. 5, the neighbor particle data candidates are the particle data p1 to p6, and no particle data overlaps the influence region EC.

If a neighbor particle data candidate overlaps the influence region EC, the determining unit 1005 determines the neighbor particle data candidate to be the neighbor particle data. The storage unit 1006 then correlates and stores the particle ID of the neighbor particle data with the object particle data. For example, the neighbor particle ID is stored in the neighbor particle ID field of the record of the object particle data in the DB 900.

If the deformation object is the region data and consequent to the determination of the neighbor particle data candidate by the determining unit 1005, the judging unit 1004 judges whether a neighbor particle data candidate overlaps the (undeformed) influence region ec of the object particle data pc. For example, in the example depicted in FIG. 6, the neighbor particle data candidates are the particle data p1 to p6, and no particle data overlaps the influence region ec.

On the other hand, in the example depicted in (B) of FIG. 7, the neighbor particle data candidates are the particle data p1 to p6, and the particle data p6 whose position has changed, overlaps the (undeformed) influence region ec of the object particle data. Therefore, the determining unit 1005 determines the particle data p6 to be the neighbor particle data of the object particle data pc. In the example depicted in (B) of FIG. 7, if the object particle data pc also overlaps the influence region E6 of the particle data p6, the determining unit 1005 can determine the object particle data pc to be the neighbor particle data of the particle data p6.

In this case, the storage unit 1006 stores the particle ID of the object particle data in the record of the particle data p6. In this way, by determining and storing as the neighbor particle data, particle data that overlap each other, the search processing can be accelerated. Such processing is also applicable when the deformation object is the circumscribing shape data sc.

The updating unit 1007 updates the deformation gradient tensor and the positional information of the object particle data pc for each object particle data pc, based on the object particle data pc and the neighbor particle data correlated with the object particle data pc.

For example, the updating unit 1007 solves the movement of a continuum particle according to a physical model set for the particle data group in advance. For example, Equation (6) is solved for a continuum particle modeling a continuum so as to obtain the acceleration ak for each particle data pk. In Equation (6), $a_i$ is the acceleration ak; $m_{ij}$ is the mass mk; $\rho_{ij}$ is the density pk; $\sigma_{ij}$ is the stress tensor ok; and W is a kernel function. The superscripts I (corresponding to k) and J are indexes of particles; the subscripts i and j are indexes indicative of coordinate axes; and a rule of contraction is applied to the index j of the coordinate axis. A summation range J is across the neighbor particle data for each particle I (particle data pk).

$$a_i^I = \sum_J m^J \left[ \left(\frac{\sigma_{ij}}{\rho^2}\right)^I + \left(\frac{\sigma_{ij}}{\rho^2}\right)^J \right] \frac{\partial W}{\partial x_j} \tag{6}$$

The deformation gradient tensor $Fk_{ij}$ is calculated for each particle data pk according to a change in the position coordinates Ck of the particle data pk. For example, the deformation gradient tensor $Fk_{ij}$ is obtained from Equation (7). In this equation, $\delta_{ij}$ is the Kronecker delta and dx is displacement of the particle data pk.

$$F_{ij}^I = \delta_{ij} - \sum_J \frac{m^J}{\rho^J}(dx_i^I - dx_i^J)\frac{\partial W}{\partial x_j} \tag{7}$$

Lastly, the velocity vk is time-integrated for each particle data pk by using the obtained acceleration ak; the position coordinates Ck are time-integrated for each particle data pk by using the velocity vk; and when a given time interval has elapsed, the calculation of one calculation step is terminated.

$$v_{i,new}^I = v_i^I + dt \cdot a_i^I \tag{8}$$

$$x_{i,new}^I = x_i^I + dt \cdot v_i^I \tag{9}$$

$V_{i,new}^I$ of Equation (8) is the velocity of the particle data pk after one calculation step. $V_i^I$ of Equation (8) is the velocity vk at the current time. $X_{i,new}^I$ of Equation (9) is the position coordinates Ck of the particle data pk after one calculation step. $X_i^I$ of Equation (9) is the position coordinates at the current time. A time interval of one calculation step is dt. It is noted that dt is preliminarily determined as a fixed value. For example, $dt=h/c_s$ may be determined, where $c_s$ is sound speed of the particle data pk and h is a typical size of the influence region ek of the particle data pk. A calculation result is output as an external file as needed. The output file is utilized when necessary numeric values and graphics are displayed on a screen or printed on paper by a separately prepared program.

The setting unit 1002 sets as the next deformation object either "the circumscribing shape data sc" or "the region data". The next deformation object is the deformation object for which the neighbor particle data is determined first. For example, when parallel execution is performed for the first state and the second state, the deformation object of the state for which the execution is completed first is set as the next deformation object. As a result, data with a shorter execution time is set as the deformation object and therefore, the search processing can be accelerated.

Figure 13:
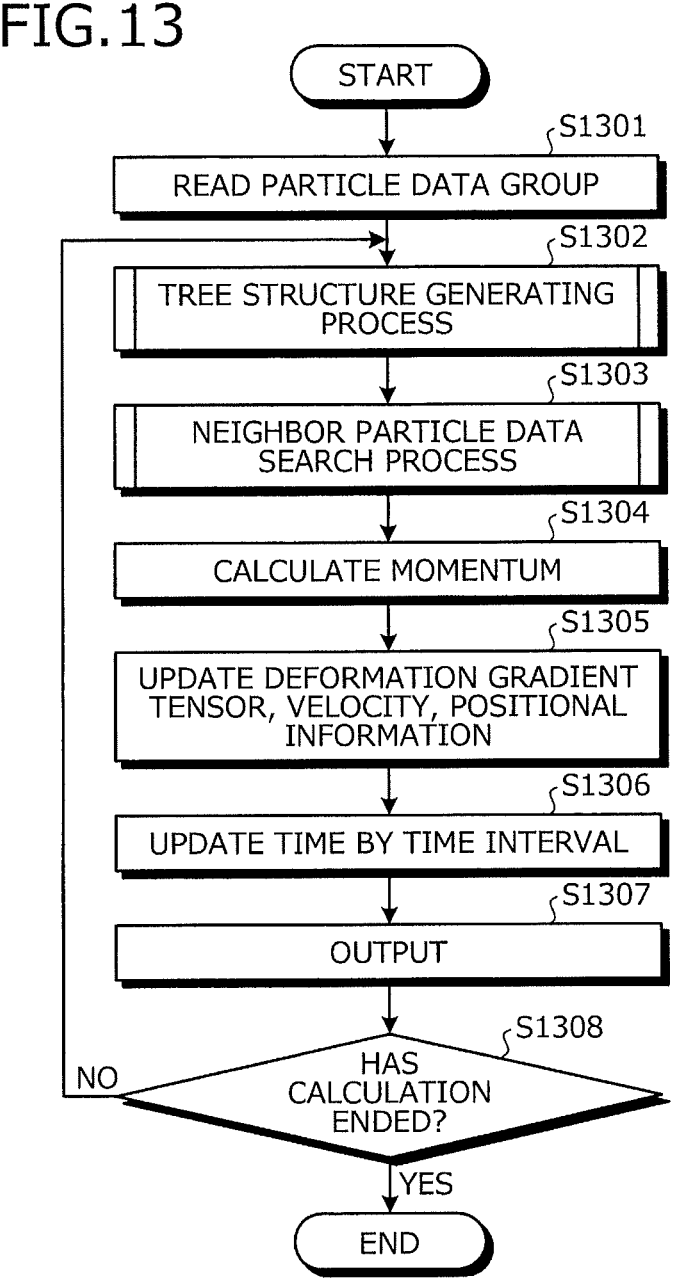
FIG. 13 is a flowchart of a search process example (part one) of a search apparatus 1000.

FIG. 13 is a flowchart of a search process example (part one) of the search apparatus 1000. First, the search apparatus 1000 reads the particle data group from the DB 900 (step S1301) and causes the generating unit 1001 to execute a tree structure generating process (step S1302). In the tree structure generating process (step S1302), a tree structure is generated as depicted in FIG. 12. Details of the tree structure generating process (step S1302) will be described with reference to FIG. 14.

The search apparatus 1000 executes a neighbor particle data search process (step S1303). In the neighbor particle data search process (step S1303), for each particle data pk, a neighbor particle data is searched for. Details of the neighbor particle data search process (step S1303) will be described with reference to FIG. 15.

After the neighbor particle data search process (step S1303), the search apparatus 1000 calculates momentum for each particle data pk (step S1304). For example, as represented by Equation (6), the search apparatus 1000 calculates the acceleration ak for each particle data pk. As represented by Equations (7) to (9), the search apparatus 1000 updates the deformation gradient tensor $FK_{ij}$, the velocity vk, and the positional information xk for each particle data pk (step S1305).

The search apparatus 1000 performs updating for one calculation step (time interval dt) (step S1306) and outputs the calculation results (the neighbor particle data, the acceleration ak, the velocity vk, the position coordinates Ck etc., for each particle data pk) (step S1307). The search apparatus 1000 judges whether the calculation has ended (step S1308).

For example, the search apparatus 1000 judges whether a predetermined calculation step number has been reached. If the calculation has not ended (step S1307: NO), the search apparatus 1000 returns to step S1302 and executes the tree structure generating process again (step S1302). As a result, a tree structure is newly generated from the updated information in the DB 900. On the other hand, if the calculation has ended (step S1308: YES), a sequence of the search processing is terminated.

Figure 14:
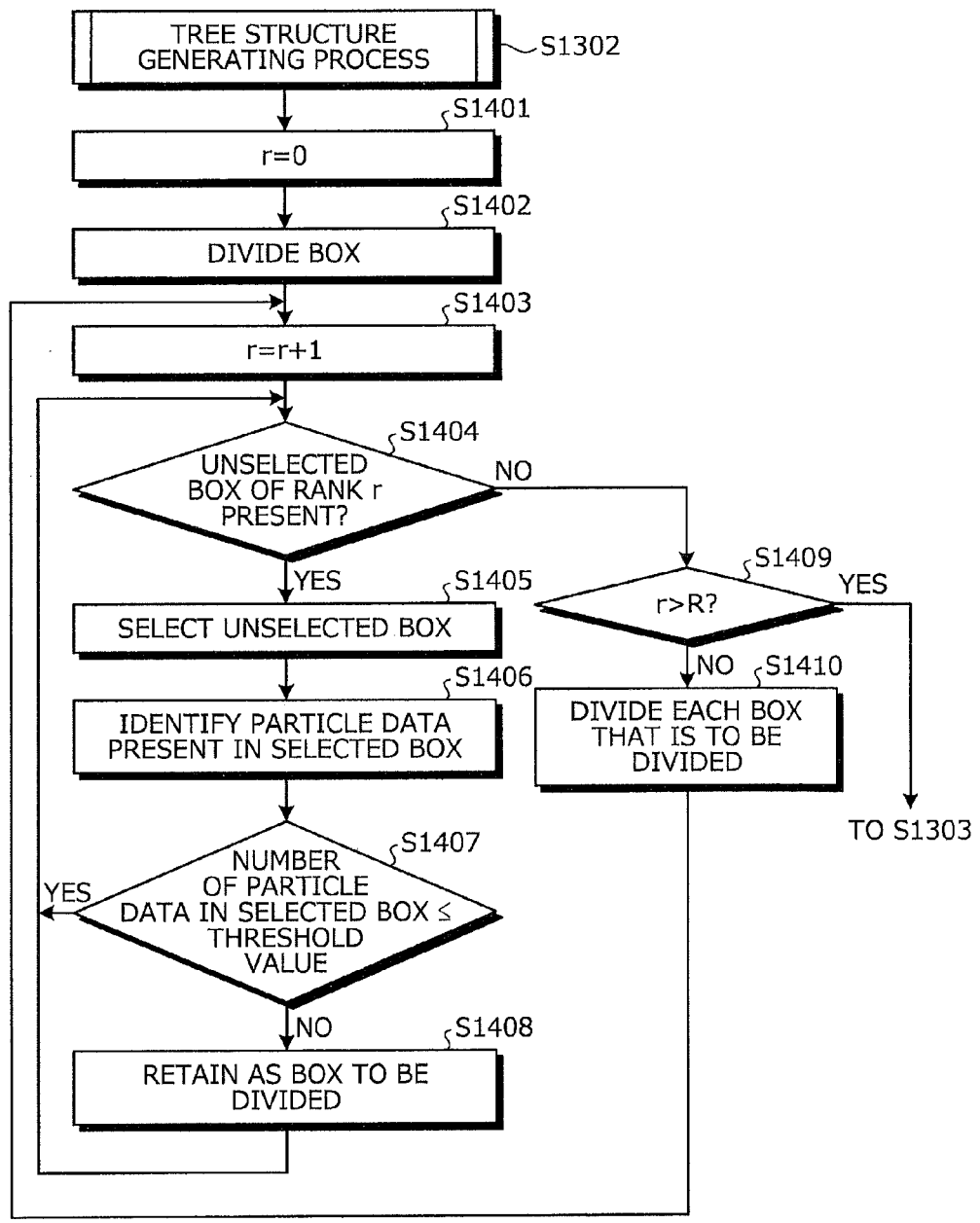
FIG. 14 is a flowchart of a detailed processing procedure example of a tree structure generating process (step S1302) depicted in FIG. 13.

FIG. 14 is a flowchart of a detailed processing procedure example of the tree structure generating process (step S1302) depicted in FIG. 13. First, the search apparatus 1000 sets a rank index r to r=0 (step S1401) and divides a box of the rank r (in this case, since r=0, the box is an undivided region data in the initial state) (step S1402). The division is performed by dividing a side into halves as described above. As a result, the box is divided into four in a two-dimensional case and into eight in a three-dimensional case.

The search apparatus 1000 increments the rank r (step S1403). As a result, the resulting boxes have the incremented rank r. The search apparatus 1000 judges whether an unselected box of the rank r is present (step S1404). If an unselected box is present (step S1404: YES), the search apparatus 1000 selects the unselected box (step S1405) and identifies particle data present in the selected box (step S1406).

The search apparatus 1000 judges if the number of particle data in the selected box is less than or equal to a threshold value (step S1407). If not less than or equal to the threshold value (step S1407: NO), the box can be further divided and therefore, the search apparatus 1000 retains the selected box as a box to be divided (step S1408) and returns to step S1404. On the other hand, if less than or equal to the threshold value (step S1407: YES), the selected box cannot be further divided and therefore, the search apparatus 1000 goes to step S1404.

If no unselected box of the rank r is present at step S1404 (step S1404: NO), the search apparatus 1000 judges whether r>R is satisfied (step S1409). R is the lower limit value of the rank. If r>R is not satisfied (step S1409: NO), the search apparatus 1000 divides each of the boxes retained at step S1408 (step S1410). The search apparatus 1000 goes to step S1403. On the other hand, if r>R is satisfied (step S1409: YES), since a tree structure has been generated, the search apparatus 1000 terminates the tree structure generating process (step S1302) and goes to step S1303.

Figure 15:
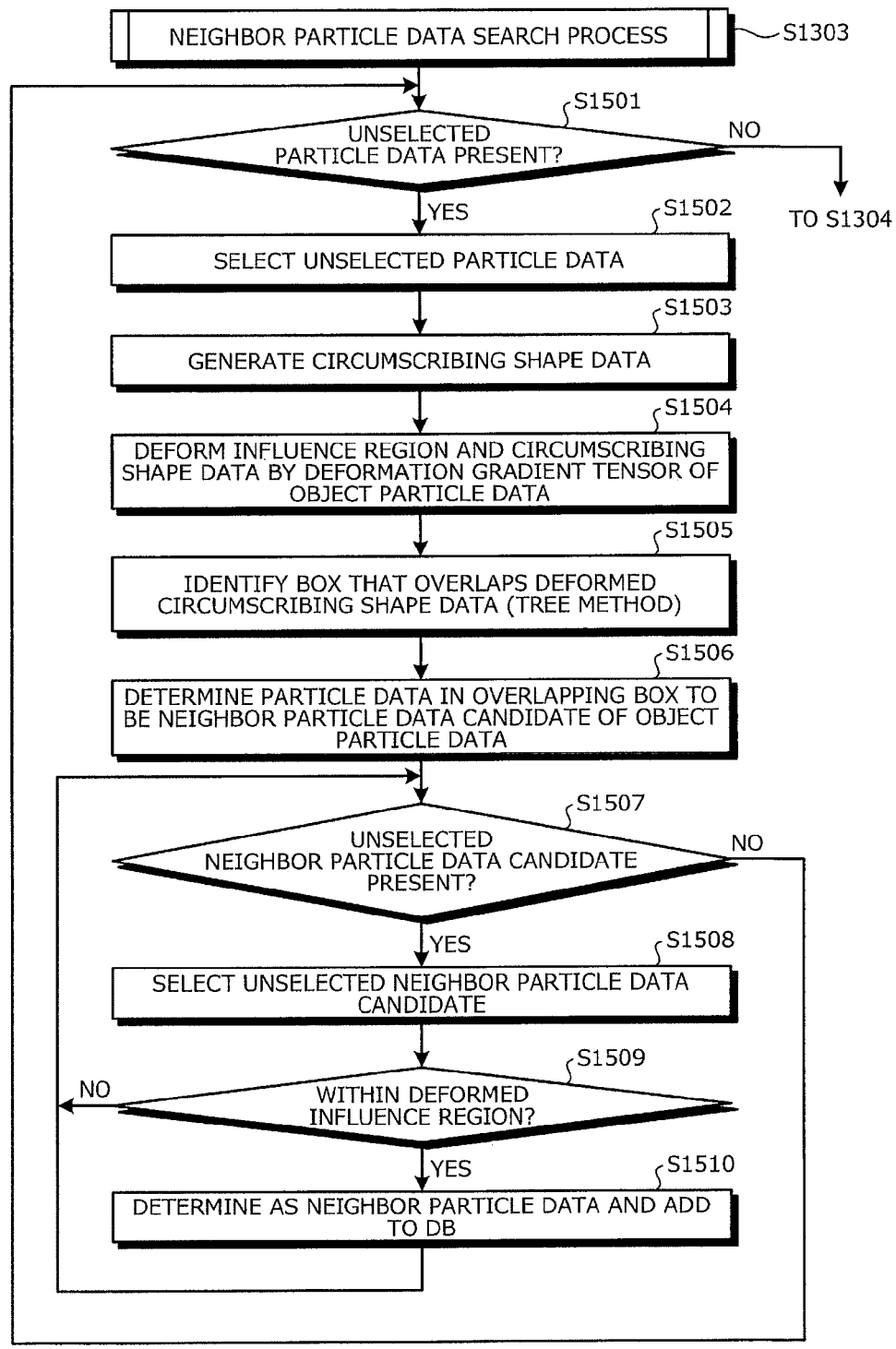
FIG. 15 is a flowchart of a detailed processing procedure example (part one) of a neighbor particle data search process (step S1303) depicted in FIG. 13.

FIG. 15 is a flowchart of a detailed processing procedure example (part one) of the neighbor particle data search process (step S1303) depicted in FIG. 13. FIG. 15 depicts an example when the deformation object is set as the circumscribing shape data of the object particle data. First, the search apparatus 1000 judges whether unselected particle data is present in the particle data group (step S1501). If it is determined that unselected particle data is present (step S1501: YES), the search apparatus 1000 selects the unselected particle data (step S1502). The selected particle data is the object particle data pc.

The search apparatus 1000 causes the generating unit 1001 to generate the influence region ec of the object particle data pc and the circumscribing shape data sc thereof (step S1503). The search apparatus 1000 causes the deforming unit 1003 to deform the influence region and the circumscribing shape data by the deformation gradient tensor $Fc_{ij}$ of the object particle data pc (step S1504).

The search apparatus 1000 identifies a box that overlaps the deformed circumscribing shape data sc (step S1505). For example, the box is identified by using the tree method. The search apparatus 1000 then causes the determining unit 1005 to determine the particle data in the overlapping box to be a neighbor particle data candidate of the object particle data pc (step S1506).

The search apparatus 1000 judges whether an unselected neighbor particle data candidate is present (step S1507). If an unselected neighbor particle data candidate is present (step S1507: YES), the search apparatus 1000 selects the unselected neighbor particle data candidate (step S1508) and judges whether the candidate is within the deformed influence region EC of the object particle data (step S1509). In this case, it may also be judged whether the object particle data pc is within the influence region of the neighbor particle data. If the candidate is within the deformed influence region EC (step S1509: YES), the search apparatus 1000 determines the neighbor particle data candidate to be the neighbor particle data of the object particle data pc and adds the particle ID of the neighbor particle data to the record of the object particle data (step S1510).

If it is judged whether the object particle data pc is within the influence region of the neighbor particle data candidate and it is judged that the data is within the influence region, the object particle data pc may be determined as the neighbor particle data of the neighbor particle data candidate and the particle ID of the object particle data pc may be added to the record of the neighbor particle data candidate. As a result, high-speed search can be implemented.

On the other hand, if the candidate is not within the deformed influence region EC at step S1509 (step S1509: NO), the search apparatus 1000 returns to step S1507. If no unselected neighbor particle data candidate is present at step S1507 (step S1507: NO), the search apparatus 1000 returns to step S1501. If no unselected particle data is present at step S1501 (step S1501: NO), the search apparatus 1000 terminates the neighbor particle data search process (step S1303) and goes to step S1304. As a result, for each object particle data pc, a neighbor particle data can be searched for.

An example of identification of an overlapping box at step S1505 will be described. It is assumed by way of example that the recursive division is completed as in FIG. 11D and that the tree structure depicted in FIG. 12 is generated before the identification.

Figure 16A:
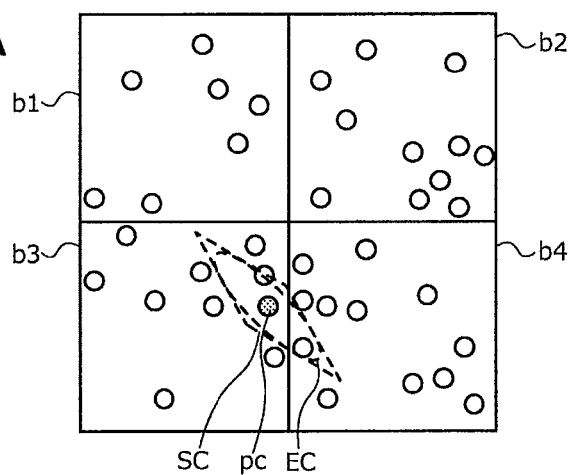
FIGS. 16A, 16B, 16C, and 16D are explanatory views of an example of identification of an overlapping box at step S1505.
Figure 16B:
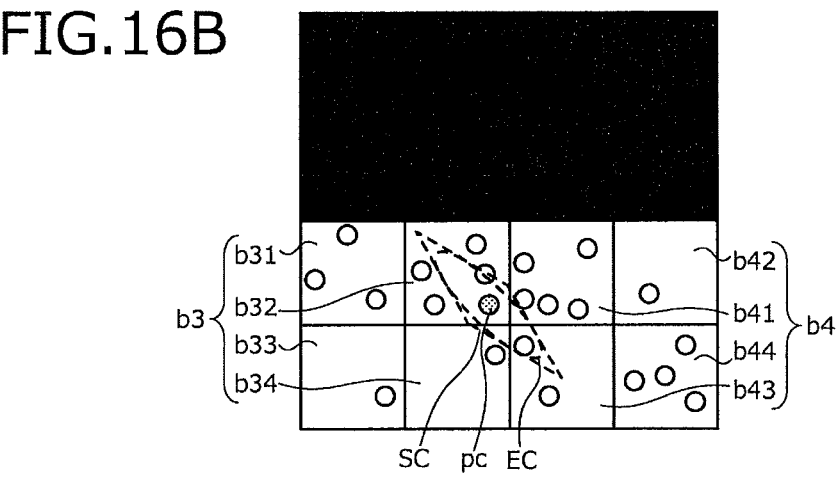

FIGS. 16A, 16B, 16C, and 16D are explanatory views of an example of identification of an overlapping box at step S1505. In FIG. 16A, the influence region ec and the circumscribing shape data sc of the object particle data pc are deformed to generate the deformed influence region EC and the deformed circumscribing shape data SC. In FIG. 16B, the search apparatus 1000 causes the judging unit 1004 to judge whether a box overlapping the circumscribing shape data sc is present among the boxes b1 to b4 of the first rank (r=1) in the state depicted in FIG. 16A. In this case, the boxes b1 and b2 do not overlap and therefore, are excluded from the identification candidates.

Figure 16C:
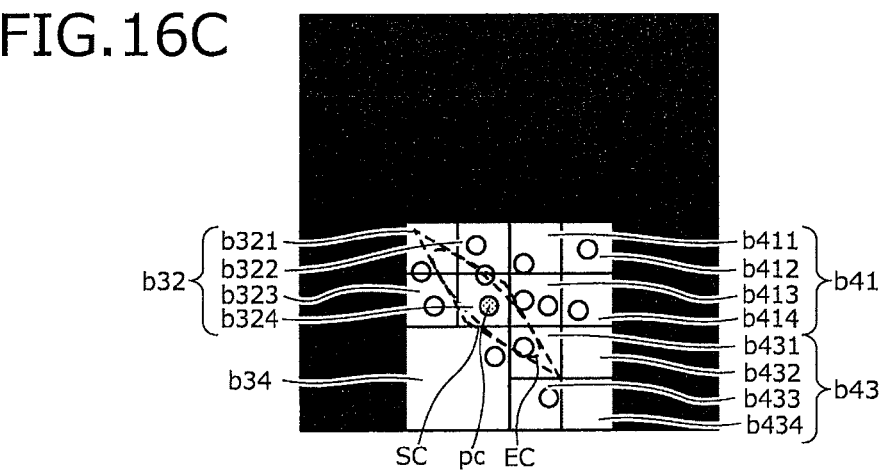

Similarly, in FIG. 16C, the search apparatus 1000 causes the judging unit 1004 to judge whether a box overlapping the circumscribing shape data SC is present among the boxes b31 to b34 and b41 to b44 of the second rank (r=2) in the overlapping boxes b3 and b4 depicted in FIG. 16B. In this case, the boxes b31, b33, b42, and b44 do not overlap and therefore, are excluded from the identification candidates.

Figure 16D:
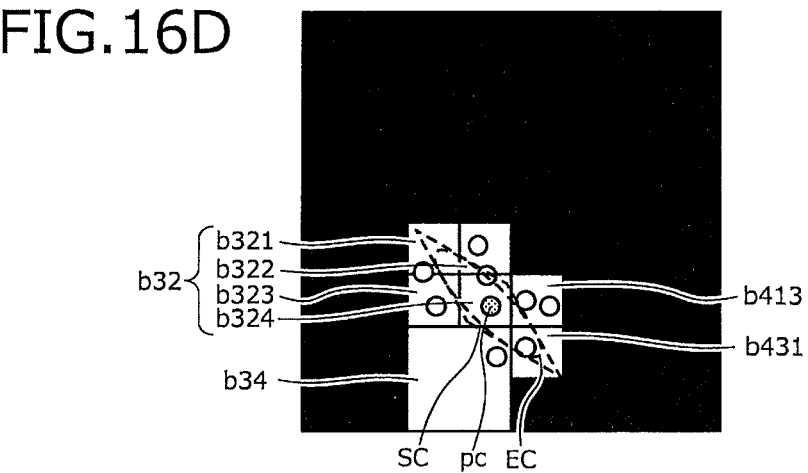

Similarly, in FIG. 16D, the search apparatus 1000 causes the judging unit 1004 to judge whether a box overlapping the circumscribing shape data SC is present among the boxes b321 to b324, b411 to b414, and b431 to b434 of the third rank (r=3) and the box b34 of the second rank (because of the absence of the third rank) in the overlapping boxes b32, b34, b 41, and b43 depicted in FIG. 16C. In this case, the boxes b411, b412, b414, b432, b433, and b434 do not overlap and therefore, are excluded from identification candidates.

In FIG. 16D, since the third rank is the lowest rank, the boxes b321 to b324, b34, b413, and b431 remaining at this stage are identified as boxes overlapping the circumscribing shape data SC. Therefore, the search apparatus 1000 determines the particle data present in each of the overlapping boxes b321 to b324, b34, b413, and b431 to be neighbor particle data candidates. The search apparatus 1000 causes the judging unit 1004 to judge whether the neighbor particle data candidates present in the overlapping boxes b321 to b324, b34, b413, and b431 overlap the deformed influence region EC. The search apparatus 1000 causes the determining unit 1005 to determine the overlapping neighbor particle data candidates as the neighbor particle data of the object particle data.

Figure 17:
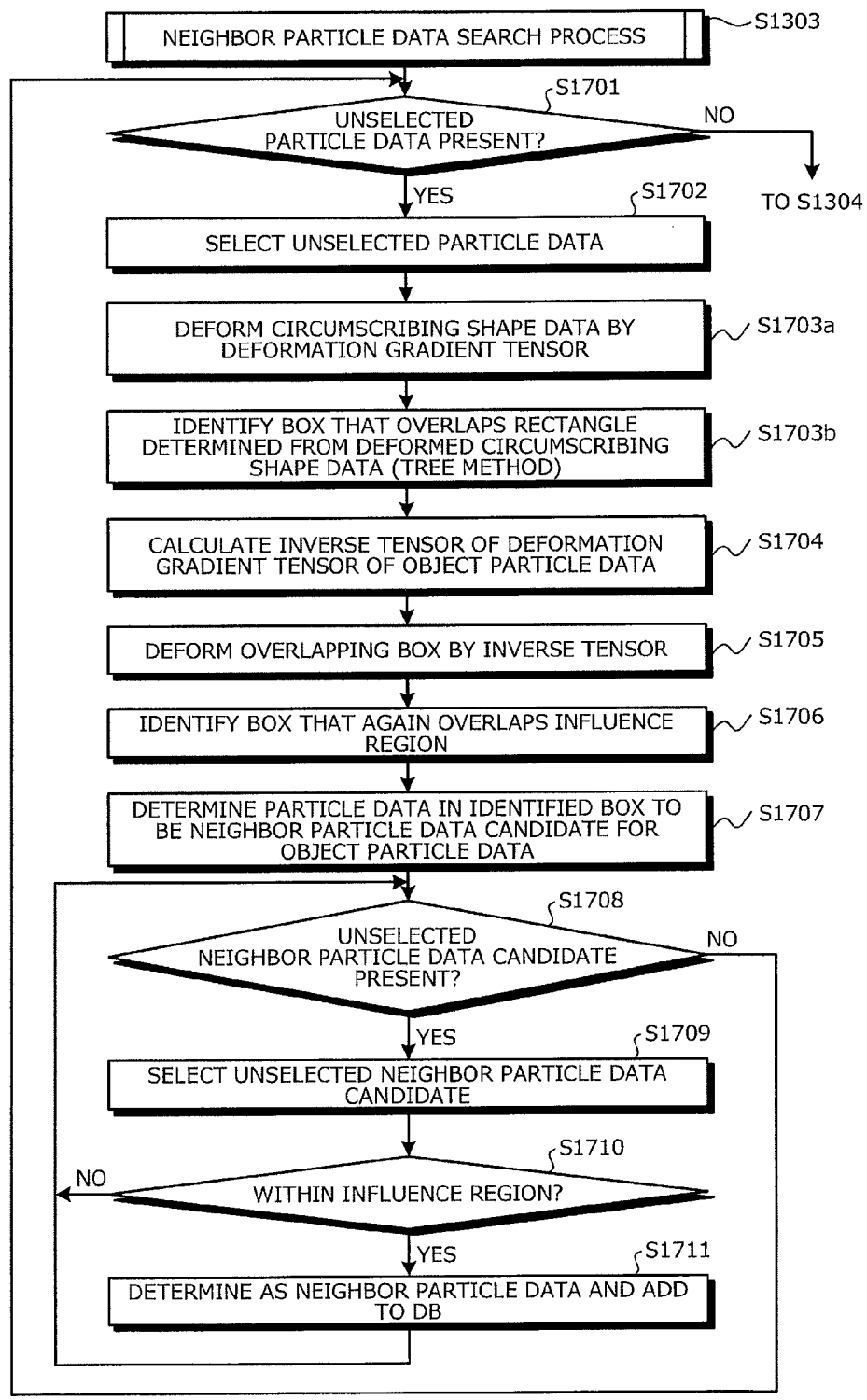
FIG. 17 is a flowchart of a detailed processing procedure example (part two) of the neighbor particle data search process (step S1303) depicted in FIG. 13.

FIG. 17 is a flowchart of a detailed processing procedure example (part two) of the neighbor particle data search process (step S1303) depicted in FIG. 13. FIG. 17 depicts an example when the deformation object is set as the region data, i.e., the box b. First, the search apparatus 1000 judges whether unselected particle data is present in the particle data group (step S1701). If it is determined that unselected particle data is present (step S1701: YES), the search apparatus 1000 selects the unselected particle data (step S1702). The selected particle data is the object particle data pc.

The search apparatus 1000 causes the generating unit 1001 to generate the circumscribing shape data sc and the search apparatus 1000 causes the deforming unit 1003 to deform the influence region and the circumscribing shape data by the deformation gradient tensor $Fc_{ij}$ of the object particle data pc (step S1703a). The search apparatus 1000 identifies a box (hereinafter referred to as an overlapping box) that overlaps a rectangle (or rectangular parallelepiped) identified by the maximum and minimum values of the deformed circumscribing shape data SC of the object particle data pc in the coordinate axes (step S1703b). In this case, for example, the tree method is used for the identification. Since the identification of the overlapping box is performed by examining overlap with a rectangle (or rectangular parallelepiped) circumscribing the deformed circumscribing shape data sc, the identification is performed at higher speed as compared to step S1505 of the neighbor particle data search process (part one) of examining overlap with a parallelogram (or parallelepiped). The search apparatus 1000 reads the deformation gradient tensor $Fc_{ij}$ of the object particle data pc from the DB 900 and calculates inverse tensor $Fc_{ij}^{-1}$ (step S1704). The search apparatus 1000 deforms the overlapping box by the inverse tensor $Fc_{ij}^{-1}$ (step S1705).

The search apparatus 1000 identifies a box that again overlaps the influence region ec of the object particle data pc, among the overlapping boxes deformed by the inverse tensor $Fc_{ij}^{-1}$ (step S1706). Since this re-identification is performed with respect to the overlapping boxes, the deformation processing by the inverse tensor $Fc_{ij}^{-1}$ can be suppressed to the minimum. A box identified at step S1706 is referred to as a re-overlapping box.

The search apparatus 1000 causes the determining unit 1005 to determine the particle data in the re-overlapping box to be a neighbor particle data candidate for the object particle data pc (step S1707). The search apparatus 1000 judges whether an unselected neighbor particle data candidate is present (step S1708). If an unselected neighbor particle data candidate is present (step S1708: YES), the search apparatus 1000 selects the unselected neighbor particle data candidate (step S1709) and judges whether the candidate is within the influence region ec of the object particle data pc (step S1710). In this case, it may also be judged whether the object particle data pc is within the influence region of the neighbor particle data.

If the candidate is within the influence region ec (step S1710: YES), the search apparatus 1000 determines the neighbor particle data candidate to be the neighbor particle data of the object particle data pc and adds the particle ID of the neighbor particle data to the record of the object particle data pc (step S1711).

It may also be judged whether the object particle data pc is within the influence region after the deformation by the inverse tensor $Fc_{ij}^{-1}$ of the neighbor particle data candidate and, if it is judged that the object particle data pc is within the influence region after the deformation, the object particle data may be determined as the neighbor particle data of the neighbor particle data candidate and the particle ID of the object particle data pc may be added to the record of the neighbor particle data candidate. As a result, high-speed search can be implemented.

On the other hand, if the neighbor particle data candidate is not within the influence region ec at step S1710 (step S1710: NO), the search apparatus 1000 returns to step S1708. If no unselected neighbor particle data candidate is present at step S1708 (step S1708: NO), the search apparatus 1000 returns to step S1701. If no unselected particle data is present at step S1701 (step S1701: NO), the search apparatus 1000 terminates the neighbor particle data search process (step S1303) and goes to step S1304. As a result, for each object particle data pc, a neighbor particle data can be searched for. Although the overlapping boxes are deformed by the inverse tensor $Fc_{ij}^{-1}$ in FIG. 17, all the boxes in the tree structure may be deformed by the inverse tensor $Fc_{ij}^{-1}$.

An example of identification of an overlapping box at steps S1703a and 1703b will be described. It is assumed by way of example that the recursive division is completed as depicted in FIG. 11D and that the tree structure depicted in FIG. 12 is generated before the identification.

Figure 18A:
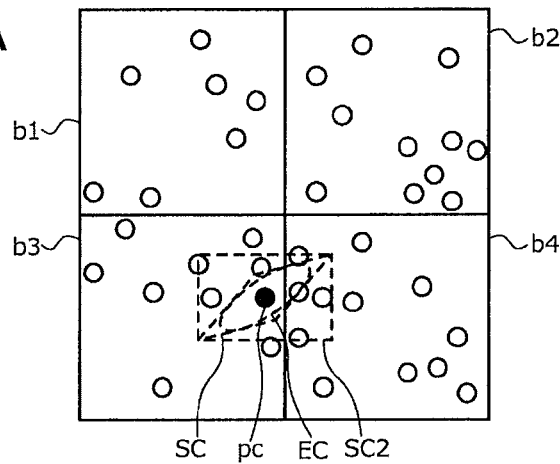
FIGS. 18A, 18B, 18C, and 18D are explanatory view of an example of identification of an overlapping box at steps S1703a and 1703b.
Figure 18B:
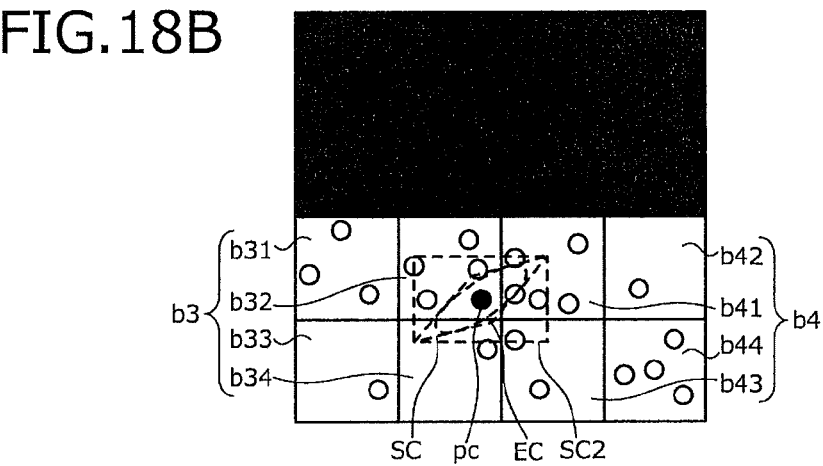

FIGS. 18A, 18B, 18C, and 18D are explanatory view of an example of identification of an overlapping box at steps S1703a and 1703b. In FIG. 18A, the deformed influence region EC and the deformed circumscribing shape data SC of the object particle data pc and a rectangle SC2 circumscribing the deformed circumscribing shape data SC are generated. In FIG. 18B the search apparatus 1000 causes the judging unit 1004 to judge whether a box overlapping the rectangle SC2 is present among the boxes b1 to b4 of the first rank (r=1) in the state depicted in FIG. 18A. In this case, the boxes b1 and b2 do not overlap and therefore, are excluded from the identification candidates.

Figure 18C:
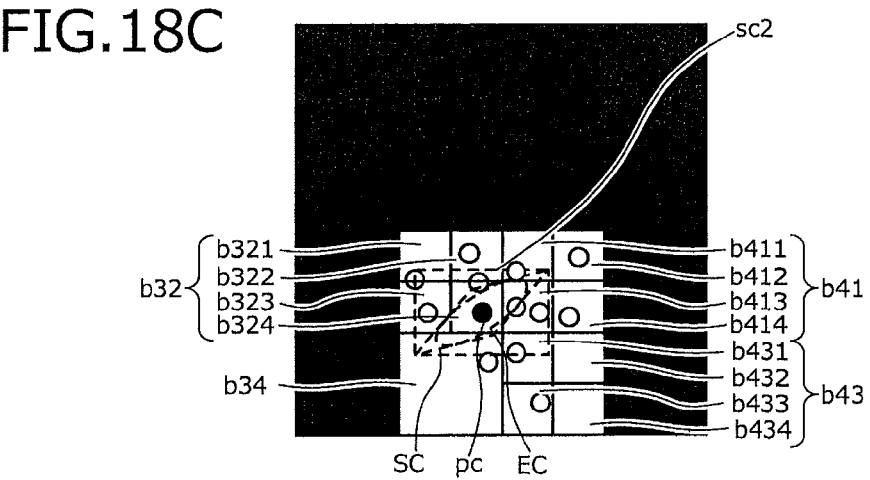

Similarly, in FIG. 18C, the search apparatus 1000 causes the judging unit 1004 to judge whether a box overlapping the rectangle SC2 is present among the boxes b31 to b34 and b41 to b44 of the second rank (r=2) in the overlapping boxes b3 and b4 depicted in FIG. 18B. In this case, the boxes b31, b33, b42, and b44 do not overlap and therefore, are excluded from the identification candidates.

Figure 18D:
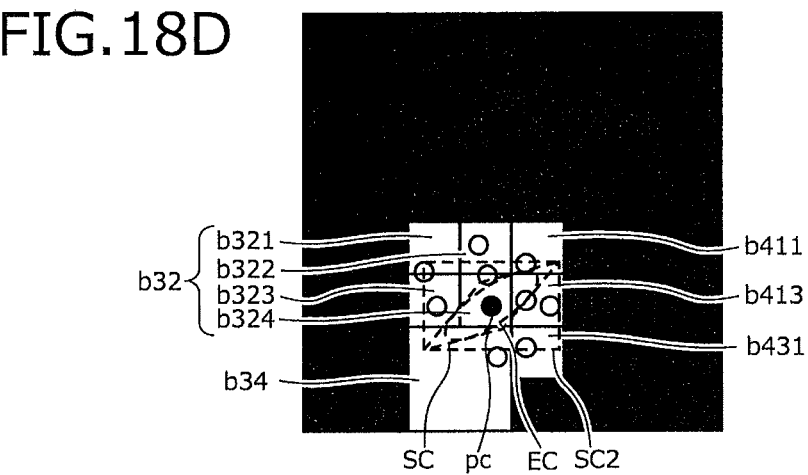

Similarly, in FIG. 18D, the search apparatus 1000 causes the judging unit 1004 to judge whether a box overlapping the rectangle SC2 is present among the boxes b321 to b324, b411 to b414, and b431 to b434 of the third rank (r=3) and the box b34 of the second rank (because of the absence of the third rank) in the overlapping boxes b32, b34, b 41, and b43 depicted in FIG. 18C. In this case, the boxes b412, b414, b432, b433, and b434 do not overlap and therefore, are excluded from the identification candidates.

In FIG. 18D, since the third rank is the lowest rank, the boxes b321 to b324, b34, b411, b413, and b441 remaining at this stage are identified as boxes overlapping the rectangle SC2. Therefore, the search apparatus 1000 deforms each of the overlapping boxes b321 to b324, b34, b411, b413, and b431 by the inverse tensor $Fc_{ij}^{-1}$ as depicted in FIG. 6 and (B) of FIG. 7.

The search apparatus 1000 causes the judging unit 1004 to judge whether each of the deformed boxes again overlaps the undeformed influence region ec of the object particle pc. The search apparatus 1000 causes the determining unit 1005 to determine as a neighbor particle data candidate, the particle data present in a deformed box that overlaps the undeformed influence region ec. The search apparatus 1000 causes the judging unit 1004 to judge whether the neighbor particle data candidates present in deformed boxes again overlapping the influence region ec, overlap the influence region ec. The search apparatus 1000 causes the determining unit 1005 to determine the overlapping neighbor particle data candidates as the neighbor particle data of the object particle data.

FIG. 19 is a flowchart of a search process example (part two) of the search apparatus 1000. In this example, the neighbor particle data search process (step S1303) depicted in FIG. 15 is referred to as "first neighbor particle data search process" and the neighbor particle data search process (step S1303) depicted in FIG. 17 is referred to as "second neighbor particle data search process". Although an example of using either the first neighbor particle data search process or the second neighbor particle data search process is described in the search process example (part one) in FIG. 13, a search described in FIG. 19 is performed by suitably selecting any one among the first and the second neighbor particle search processes.

First, the search apparatus 1000 reads the particle data group from the DB 900 (step S1901) and judges whether a predetermined calculation step number has been reached (step S1902). If not (step S1902: NO), the search apparatus 1000 causes the generating unit 1001 to execute the tree structure generating process (step S1903). The tree structure generating process (step S1903) is the same process as the tree structure generating process (step S1302). In the tree structure generating process (step S1903), the tree structure as depicted in FIG. 12 is generated.

The search apparatus 1000 executes the neighbor particle data search process (step S1904). In the neighbor particle data search process (step S1904), any one among the first and the second neighbor particle data search processes is set and executed.

After the neighbor particle data search process (step S1904), the search apparatus 1000 calculates momentum for each particle data pk (step S1905). For example, as represented by Equation (6), the search apparatus 1000 calculates the acceleration ak for each particle data pk. As represented by Equations (7) to (9), the search apparatus 1000 updates the deformation gradient tensor $Fk_{ij}$, the velocity vk, and the positional information for each particle data pk (step S1906).

The search apparatus 1000 updates the time by the time interval dt (step S1907) and outputs the calculation results (the neighbor particle data, the acceleration ak, the velocity vk, the position coordinates Ck, etc. of each particle data pk) (step S1908). The search apparatus 1000 judges whether the calculation has ended (step S1909). For example, the search apparatus 1000 judges whether a predetermined calculation step number has been reached. If the calculation has ended (step S1909: YES), a sequence of the search processing is terminated.

On the other hand, if the calculation has not ended (step S1909: NO), it is determined whether the first neighbor particle data search process and the second neighbor particle data search process have been performed in parallel at steps S1913 and at S1914 (step S1910) (S1913 and at S1914 are described later). If parallel execution has not been performed in this calculation step (step S1910: NO), the search apparatus 1000 returns to step S1902.

On the other hand, if the parallel execution has been performed (step S1910: YES), the search apparatus 1000 selects the neighbor particle data search process whose the neighbor particle data has been selected at step S1915 (step S1911) and returns to step S1902. The neighbor particle data search process selected at step S1911 is executed at step S1904 at the next calculation step.

At step S1902, if the predetermined calculation step number has been reached (step S1902: YES), the search apparatus 1000 causes the generating unit 1001 to execute the tree structure generating process (step S1912). The tree structure generating process (step S1912) is the same process as the tree structure generating process (step S1302). In the tree structure generating process (step S1912), the tree structure as depicted in FIG. 12 is generated.

The search apparatus 1000 performs the first neighbor particle data search process and the second neighbor particle data search process in parallel (steps S1913 and 1914). The search apparatus 1000 selects the neighbor particle data of the process that first completes the search (step S1915), and calculates momentum (step S1905). In this case, the search apparatus 1000 terminates the neighbor particle data search process for which the search has not been completed, when the execution of the neighbor particle data search process that first completes the search is completed, and erases the partially acquired neighbor particle data.

According to the search process example (part two) of the search apparatus 1000, since the faster neighbor particle data search process is selected, the neighbor particle data search can be accelerated.

As described, according to the embodiment, the efficiency of the neighbor particle search can be improved. For example, based on the tree method, efficiency of the neighbor particle search can be improved by circumscribing shape data thereof, even if particle data is deformed. The embodiment includes the first neighbor particle data search process (FIG. 15) and the second neighbor particle data search process (FIG. 17) as a technique of determining whether a box of the tree method is included in an influence region.

In the first neighbor particle data search process (FIG. 15), the circumscribing shape data of the object particle data is deformed by the deformation gradient tensor of the object particle data, into a parallelogram or a parallelepiped to make a determination concerning overlap between the object particle data and the region data (box). By deforming the circumscribing shape data of the influence region, the chances of handling particles outside the influence region as neighbor particle data candidates can be reduced as compared to the case of using the circumscribing shape data without deformation. Consequently, the calculation load can be reduced.

On the other hand, in the second neighbor particle data search process (FIG. 17), the region data (box) is deformed by the inverse tensor of the deformation gradient tensor of the object particle data, into a parallelogram or a parallelepiped to make a determination concerning overlap with the object particle data. In this case, only the tree method box (before deformation by the inverse tensor) included in the influence region has to be handled.

The first neighbor particle data search process (FIG. 15) reduces a calculation amount because the calculation of the inverse tensor is not necessary as compared to the second neighbor particle data search process (FIG. 17), and can achieve the reduction in the calculation load.

The second neighbor particle data search process (FIG. 17) enables the overlapping boxes alone to be considered as re-overlapping objects. In other words, if a box does not overlap before deformation, the particle data in the box is less likely to be neighbor particle data and therefore, such a box can be excluded from the re-overlapping objects to improve the efficiency of the search processing.

By suitably selecting the more efficient process among the first neighbor particle data search process (FIG. 15) and the second neighbor particle data search process (FIG. 17), the efficiency of the search process can be improved and the search process can be accelerated.

According to one aspect of the embodiment, the efficiency of the neighbor particle search can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing a search program for searching for a neighbor particle located in proximity of an object particle, the search program causing a computer to execute a process comprising steps of:
generating circumscribing shape data that circumscribes an influence region of object particle data, the circumscribing shape data being generated based on positional information of the object particle data that is in a particle data group read from a storage device that stores each particle data in the particle data group, positional information and a deformation gradient tensor;
setting any one among the generated circumscribing shape data and region data that has at least one particle data among the particle data group as a deformation object;
deforming the set deformation object, based on the deformation gradient tensor of the object particle data;
judging whether an overlap exists between the deformed deformation object and a deformation-exempt object that is among the circumscribing shape data and the region data, wherein the deformation-exempt object is not set as the deformation object;
determining particle data in the region data, as a neighbor particle data candidate of the object particle data, upon judging that an overlap exists between the deformed deformation object and the deformation-exempt object; and
storing a result of the determining step to the storage device.

2. The recording medium according to claim 1, wherein
the setting step includes setting the circumscribing shape data as the deformation object,
the deforming step includes deforming, by the deformation gradient tensor of the object particle data, a circumscribing shape data set wherein the circumscribing shape data set is set as the deformation object at the setting step, and
the judging step includes judging whether an overlap exists between the deformed circumscribing shape data and the region data.

3. The recording medium according to claim 2, the process further comprising steps of:
judging whether the neighbor particle data candidate overlaps an influence region deformed together with the circumscribing shape data at the deforming step, wherein
the determining step includes determining the neighbor particle data candidate judged to overlap the deformed influence region as neighbor particle data of the object particle data, and
the storing step includes correlating and storing the object particle data and the neighbor particle data to the storage device.

4. The recording medium according to claim 1, wherein
the setting step includes setting the region data as the deformation object,
the deforming step includes deforming, by an inverse tensor of the deformation gradient tensor, a region data set as the deformation object, wherein the region data set is set at the setting step, and
the judging step includes judging whether an overlap exists between the influence region and the deformed region data.

5. The recording medium according to claim 4, the process further comprising steps of:
judging whether the neighbor particle data candidate of the region data deformed at the deforming step overlaps the influence region of the object particle data, wherein
the determining step includes determining the neighbor particle data candidate judged to overlap the influence region of the object particle data at the judging step as neighbor particle data of the object particle data, and
the storing step includes correlating and storing the object particle data and the neighbor particle data to the storage device.

6. The recording medium according to claim 1, the process further comprising steps of:
updating for each object particle data, the deformation gradient tensor and positional information of the object particle data, based on the object particle data and neighbor particle data correlated with the object particle data.

7. The recording medium according to claim 6, wherein the setting step includes alternately setting the deformation object at a predetermined switching timing.

8. The recording medium according to claim 6, wherein
the setting step includes setting a next deformation object, wherein the next deformation object is a deformation object in a state for which the neighbor particle data is determined first, the state being among a first state in which the circumscribing shape data is set as the deformation object and a second state in which the region data is set as the deformation object.

9. A search apparatus comprising:
a storage device storing each particle data in a particle data group, positional information and a deformation gradient tensor; and
a processor configured to:
generate circumscribing shape data that circumscribes an influence region of object particle data that is in the particle data group read from the storage device, the circumscribing shape data being generated based on the positional information of the object particle data,
set any one among the generated circumscribing shape data and region data that has at least one particle data among the particle data group as a deformation object,
deform the set deformation object, based on the deformation gradient tensor of the object particle data,
judge whether an overlap exists between the deformed deformation object and a deformation-exempt object that is among the circumscribing shape data and the region data, wherein the deformation-exempt object is not set as the deformation object,
determine particle data in the region data, as a neighbor particle data candidate of the object particle data, upon judging that an overlap exists between the deformed deformation object and the deformation-exempt object, and
store a determination result to the storage device.

10. The search apparatus according to claim 9, wherein the processor:
sets the circumscribing shape data as the deformation object,
deforms, by the deformation gradient tensor of the object particle data, a circumscribing shape data set wherein the circumscribing shape data set is set as the deformation object, and
judges whether an overlap exists between the deformed circumscribing shape data and the region data.

11. The search apparatus according to claim 10, wherein the processor:
judges whether the neighbor particle data candidate overlaps an influence region deformed together with the circumscribing shape data when deforming the circumscribing shape data set,
determines the neighbor particle data candidate judged to overlap the deformed influence region as neighbor particle data of the object particle data, and
correlates and stores the object particle data and the neighbor particle data to the storage device.

12. The search apparatus according to claim 9, wherein the processor:
sets the region data as the deformation object,
deforms, by an inverse tensor of the deformation gradient tensor, a region data set as the deformation object, wherein the region data set is set by the processor and
judges whether an overlap exists between the influence region and the deformed region data.

13. The search apparatus according to claim 12, wherein the processor:
judges whether the neighbor particle data candidate of the deformed region data set overlaps the influence region of the object particle data,
determines the neighbor particle data candidate judged to overlap the influence region of the object particle data as neighbor particle data of the object particle data, and
correlates and stores the object particle data and the neighbor particle data to the storage device.

14. The search apparatus according to claim 9, wherein the processor sets a next deformation object, wherein the next deformation object is a deformation object in a state for which neighbor particle data is determined first, the state being among a first state in which the circumscribing shape data is set as the deformation object and a second state in which the region data is set as the deformation object.

15. A search method of searching for a neighbor particle located in proximity of an object particle, the search method comprising steps of:
generating circumscribing shape data that circumscribes an influence region of object particle data, the circumscribing shape data being generated based on positional information of the object particle data that is in a particle data group;
setting any one among the generated circumscribing shape data and region data that has at least one particle data among the particle data group as a deformation object;
deforming the set deformation object, based on a deformation gradient tensor of the object particle data;
judging whether an overlap exists between the deformed deformation object and a deformation-exempt object that is among the circumscribing shape data and the region data, wherein the deformation-exempt object is not set as the deformation object;
determining particle data in the region data, as a neighbor particle data candidate of the object particle data, upon judging that an overlap exists between the deformed deformation object and the deformation-exempt object; and
storing a result of the determining step to a storage device, a result of the determining, wherein the search method is executed by a computer.

16. The search method according to claim 15, wherein
the setting step includes setting the circumscribing shape data as the deformation object,
the deforming step includes deforming, by the deformation gradient tensor of the object particle data, a circumscribing shape data set wherein the circumscribing shape data set is set as the deformation object at the setting step, and
the judging step includes judging whether an overlap exists between the deformed circumscribing shape data and the region data.

17. The search method according to claim 16, the process further comprising steps of:
judging whether the neighbor particle data candidate overlaps an influence region deformed together with the circumscribing shape data at the deforming step, wherein
the determining step includes determining the neighbor particle data candidate judged to overlap the deformed influence region as neighbor particle data of the object particle data, and
the storing step includes correlating and storing the object particle data and the neighbor particle data to the storage device.

18. The search method according to claim 15, wherein
the setting step includes setting the region data as the deformation object,
the deforming step includes deforming, by an inverse tensor of the deformation gradient tensor, a region data set as the deformation object, wherein the region data set is set at the setting step, and
the judging step includes judging whether an overlap exists between the influence region and the deformed region.

19. The search method according to claim 18, the process further comprising steps of:
  judging whether the neighbor particle data candidate of the region data deformed at the deforming step overlaps the influence region of the object particle data, wherein
  the determining step includes determining the neighbor particle data candidate judged to overlap the influence region of the object particle data at the judging step as neighbor particle data of the object particle data, and
  the storing step includes correlating and storing the object particle data and the neighbor particle data to the storage device.

20. The search method according to claim 15, wherein
  the setting step includes setting a next deformation object, wherein the deformation object is a deformation object in a state for which neighbor particle data is determined first, the state being among a first state in which the circumscribing shape data is set as the deformation object and a second state in which the region data is set as the deformation object.

\* \* \* \* \*